(12) United States Patent  
Kodama

(10) Patent No.: US 7,206,790 B2  
(45) Date of Patent: Apr. 17, 2007

(54) DATA MANAGEMENT SYSTEM

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/890,652

(22) Filed: Jul. 13, 2004

(65) Prior Publication Data

US 2006/0015544 A1 Jan. 19, 2006

(51) Int. Cl.  
*G06F 17/30* (2006.01)  
*G06F 17/00* (2006.01)

(52) U.S. Cl. .................. 707/102; 707/101; 707/103 R; 707/104.1; 707/201; 707/203; 707/204; 707/205; 715/828

(58) Field of Classification Search .................. 707/10, 707/200, 201, 103 R, 202, 203, 204, 101, 707/102, 104.1, 205; 717/171, 105; 709/226; 715/828  
See application file for complete search history.

(56) References Cited

U.S. PATENT DOCUMENTS

| | | | |
|---|---|---|---|
| 5,065,347 | A | 11/1991 | Pajak et al. |
| 5,388,196 | A | 2/1995 | Pajak et al. |
| 5,495,607 | A * | 2/1996 | Pisello et al. .................. 707/10 |
| 5,890,165 | A * | 3/1999 | Boudrie et al. .............. 707/202 |
| 5,953,525 | A * | 9/1999 | Glaser et al. ................ 717/105 |
| 6,173,293 | B1 * | 1/2001 | Thekkath et al. ............ 707/201 |
| 6,282,602 | B1 | 8/2001 | Blumenau et al. |
| 6,329,985 | B1 | 12/2001 | Tamer et al. |
| 6,330,572 | B1 * | 12/2001 | Sitka .......................... 707/205 |
| 6,380,957 | B1 * | 4/2002 | Banning ..................... 715/828 |
| 6,854,035 | B2 | 2/2005 | Dunham et al. |
| 2002/0078065 | A1 * | 6/2002 | Agulhon .................. 707/103 R |
| 2003/0028867 | A1 * | 2/2003 | Kryloff et al. .............. 717/171 |
| 2003/0115218 | A1 * | 6/2003 | Bobbitt et al. .............. 707/200 |
| 2004/0073677 | A1 * | 4/2004 | Honma et al. .............. 709/226 |
| 2004/0093360 | A1 * | 5/2004 | Hudson ...................... 707/204 |
| 2004/0107225 | A1 * | 6/2004 | Rudoff ....................... 707/204 |
| 2004/0139128 | A1 * | 7/2004 | Becker et al. .............. 707/204 |
| 2004/0167903 | A1 * | 8/2004 | Margolus et al. ............. 707/10 |
| 2005/0049998 | A1 * | 3/2005 | Ruhlow et al. ................ 707/1 |
| 2005/0149584 | A1 * | 7/2005 | Bourbonnais et al. ...... 707/204 |
| 2005/0267918 | A1 * | 12/2005 | Gatev et al. ................ 707/203 |

OTHER PUBLICATIONS

Veritas, "Ensuring Storage Resource Integrity", Veritas SANPoint Control™ 3.6, 2003, 2 pps., Mountain View, CA.  
ApplQ, Inc. "Storage Authority Suite", Apr. 30, 2004, 3 pps.  
Aptare Software Solutions, "Aptare Storage Console™, Software Overview", 2003, 10 pps., Santa Clara, CA.  
Nirvana, "Collaborative Data Sharing In Complex Distributed Environments Storage Resource Broker", 12 pps., San Diego, CA.

\* cited by examiner

*Primary Examiner*—Thuy N. Pardo  
(74) *Attorney, Agent, or Firm*—Townsend and Townsend and Crew LLP

(57) ABSTRACT

A method of collecting information about data and data handling processes from different types of applications in the context of a storage system is described. The retrieved information is presented to the user to illustrate the relationships among the data, for example, in the form of a data view illustrating the relationship among files, a storage view, illustrating the physical location at which the stored data is located, or a path view illustrating a particular path through the topology of the overall computing system and storage system. Also described are techniques for assuring the accuracy of backed up files.

19 Claims, 28 Drawing Sheets

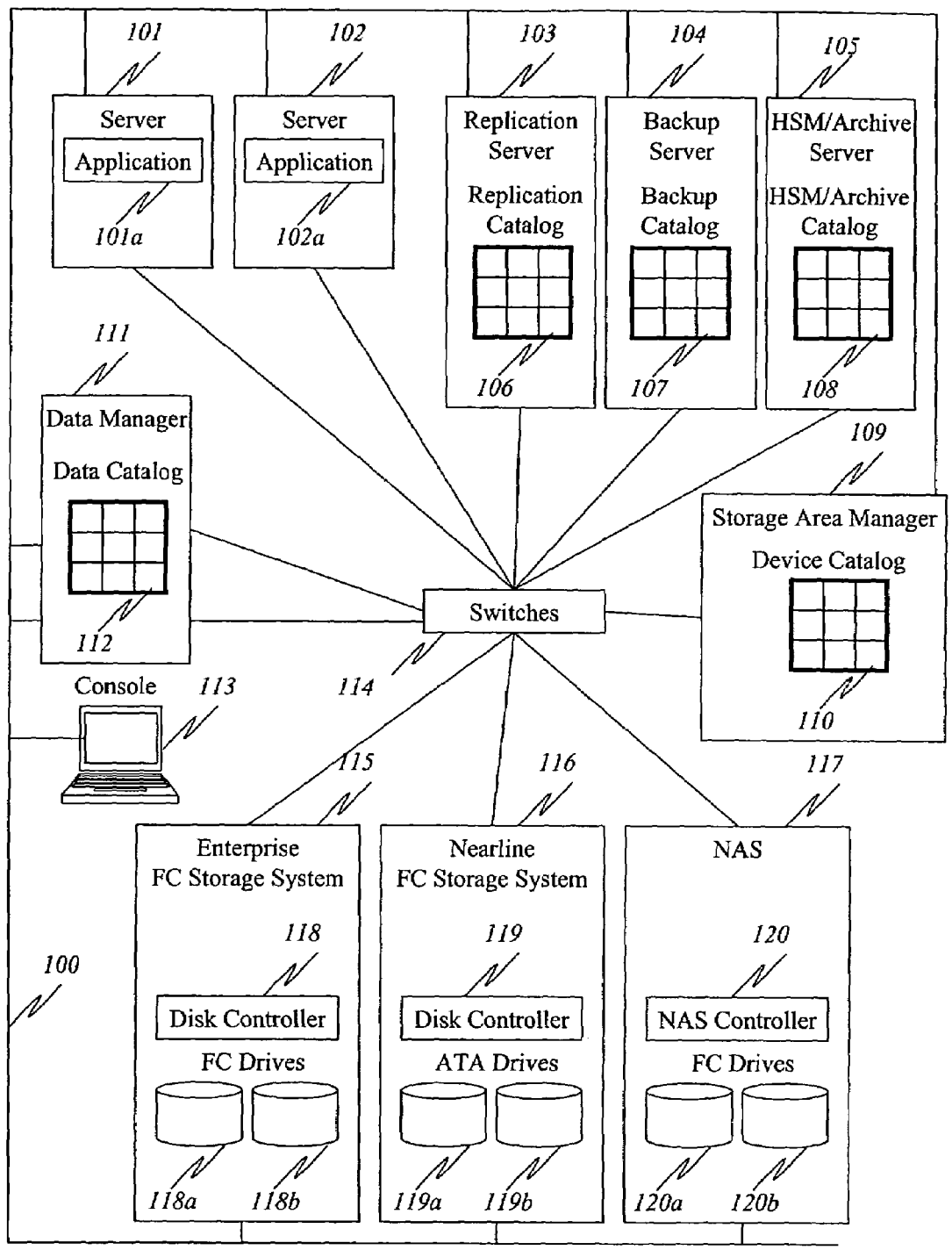
Figure 1: System Configuration

| Media Name | 30DAYs |
| --- | --- |
| Server | Trinity |
| Folder | C:\Folder_A |
| Archive Media | Media_Z |
| Archive Timing | No access in 30 days |

200

Figure 2: HSM/Archive Catalog for Archive Profile (Case 1)

| Media Name | Media_Z |
| --- | --- |
| Archive Folder | (Server_B, D:\Folder_B) |
| Capacity | 2TB |

201

Figure 3: HSM/Archive Catalog for Media Information

202

| ID | AK001 |
| --- | --- |
| Source Data | (Trinity, C:\Folder_A\File_C, 210GBytes, Kodama, Read&Write) |
| Archive Media | Media_Z |
| Archive Stream | File002 |
| Archive Time | 2:00am, April 24$^{th}$, 2004 |

Figure 4: Archive Catalog for Archive Data (Case 1)

| Profile Name | *Daily_Backup* |
|---|---|
| Source | *(Server_C, E:\Folder_C)* |
| Backup Media | *Media_X* |
| Backup Time | *1:00AM everyday* |
| Backup Type | *Full Backup* |
| Next Backup Time | *1:00AM, April 23rd, 2004* |

*Figure 5: Backup Catalog for Backup Profile*

| Policy Name | *Media_X* |
|---|---|
| Physical Storage | *(Server_C, F:\Folder_D)* |
| Capacity | *2TB* |

*Figure 6: Backup Catalog for Media Information*

| ID | *BU001* |
|---|---|
| Data Source | *(Server_C, E:\Folder_C\File_A, 110GBytes, Kodama, Read&Write)* <br> *(Server_C, E:\Folder_C\File_B, 501GBytes, Kodama, Read&Write)* |
| Backup Media | *Media_X* |
| Backup Stream | *Stream_Y* |
| Backup Time | *1:00AM, April 22nd, 2004* |
| Backup Type | *Full Backup* |

*Figure 7: Backup Catalog for Backup Data*

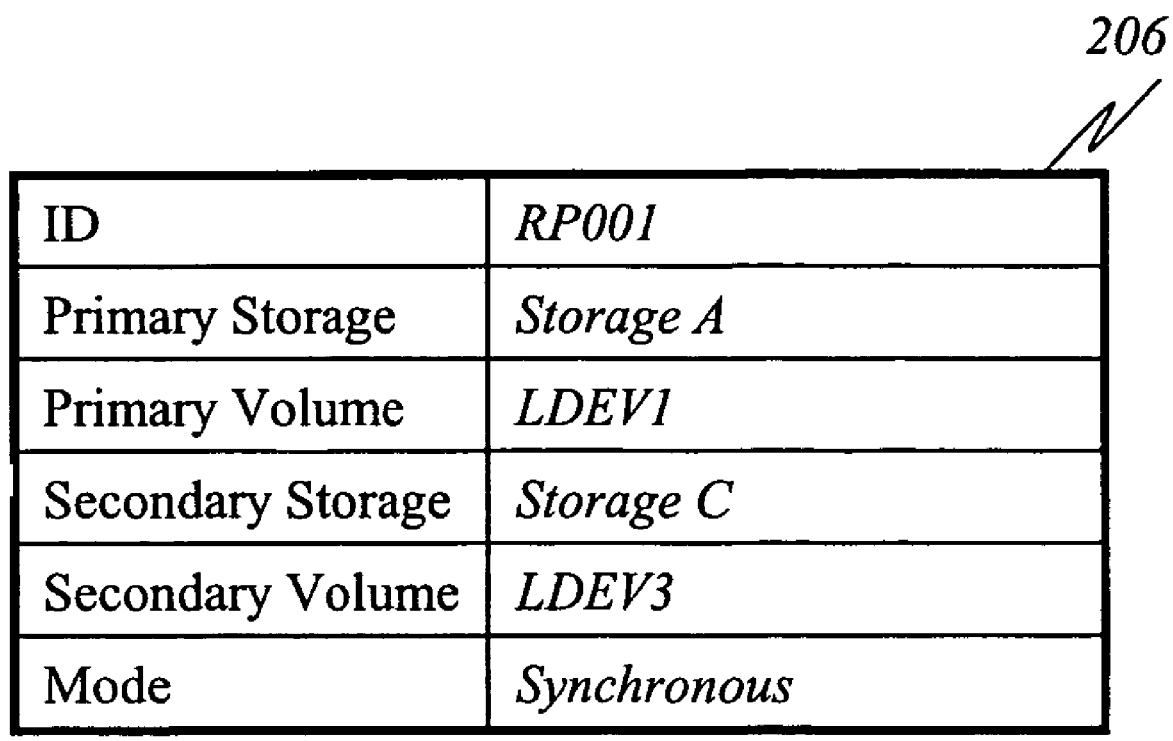
Figure 8: Replication Catalog

| ID | DEV001 |
|---|---|
| Storage Name | Storage A |
| IP Address | 192.168.1.1 |
| Port | PortA |
| LUN | LU1 |
| LDEV# | LDEV1 |
| Size | 2TB |
| RAID | 7D+1P, RAID5 |
| Drive Type | Fibre Channel |
| Created Data | 1:00PM, March 1st, 2004 |

207

Figure 9: Device Catalog for Volume

| ID | DEV002 |
|---|---|
| Storage Name | Storage A |
| IP Address | 192.168.1.1 |
| # of LU | 1024 |
| Max Installed Capacity | 50TB |
| Available Capacity | 17TB |
| # of Port | 32 |
| Cache Size | 17GB |
| Port A WWN | WWN_12892 |
| Port B WWN | WWN_93273 |

208

Figure 10: Device Catalog for Storage

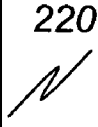
*Figure 11: Device Catalog for File System*
*Figure 12: Device Catalog for Path*
*Figure 13: Device Catalog for Application*

| Media Name | 30DAYs |
|---|---|
| Server | Trinity |
| Application | EmailServer |
| Archive Media | Media_Z |
| Archive Timing | No access in 30 days |

223

Figure 14: HSM/Archive Catalog for Archive Profile (Case 2)

| ID | AK001 |
|---|---|
| Server Name | Trinity |
| Source Data | Message_ID_0001, 1MByes<br>Message_ID_0002, 2MByes<br>Message_ID_0003, 4MByes |
| Archive Media | Media_Z |
| Archive Data | File001 |
| Archive Time | 2:00am, April 24$^{th}$, 2004 |

224

Figure 15: Archive Catalog for Archive Data (Case 2)

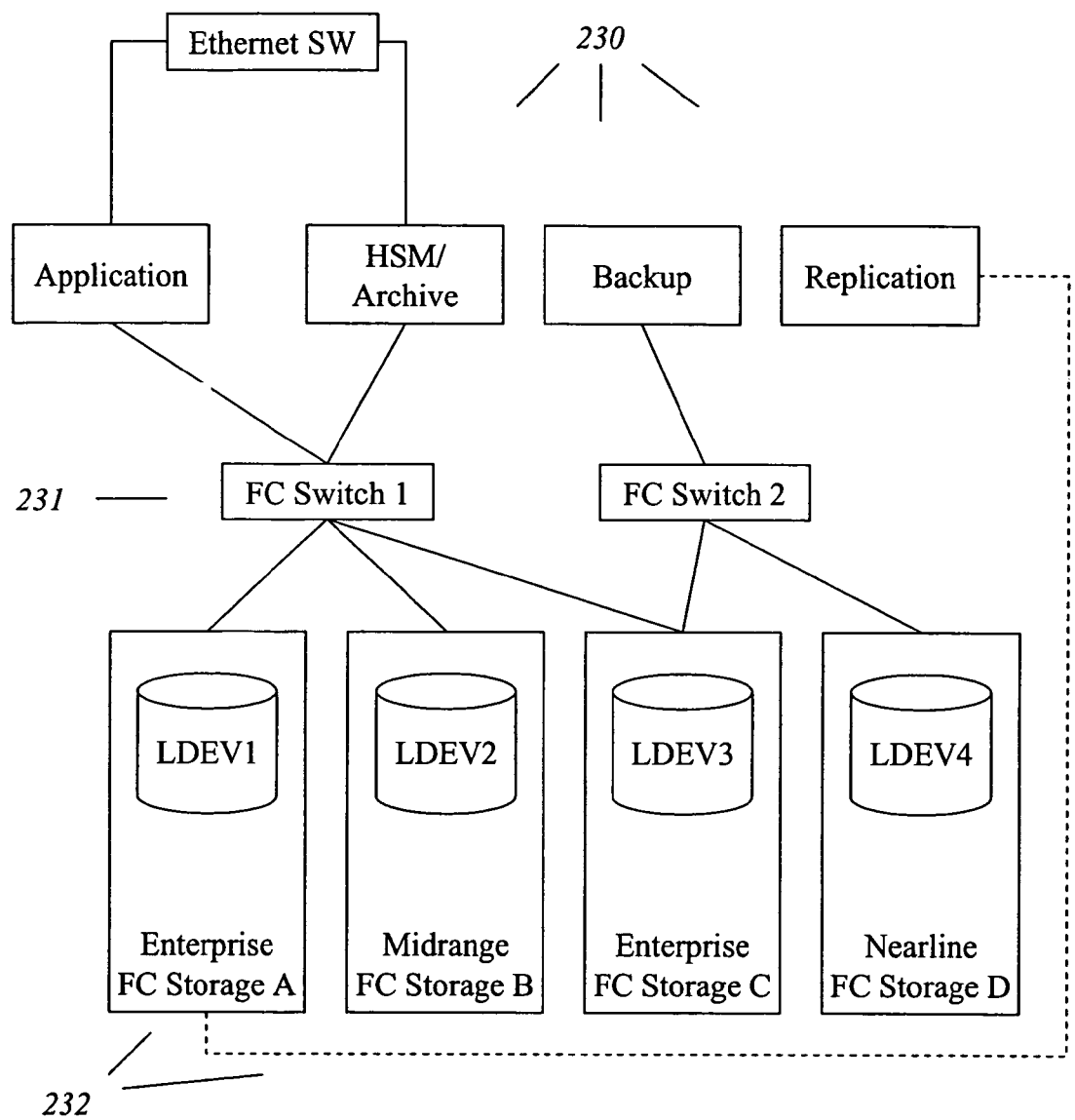
Figure 16: An Example

240

| | Global ID | GID_00000001 |
|---|---|---|
| Logical Information | Host Name | Trinity |
| | Path Name | C:\Folder_A\File_A |
| | Data Owner | \\HDS\Kodama |
| | Access Control | Read & Write |
| | Data Size | 110GBytes |
| | Created Time | 11:00pm, April 23rd, 2004 |
| | Modified Time | 5:00am, April 24th, 2004 |
| | Last Access Time | 6:00am, April 24th, 2004 |
| | Access Count | 10 times per day |
| File System Info. | Mount Point | C:\Folder_A |
| | File System Type | NTFS |
| | Max File System Size | 2TBytes |
| Physical Information | Storage | Lightning9900<br>192.168.1.1<br>LDEV1 |
| | Max Volume Size | 2TBytes |
| | RAID Level | RAID5 (7D+1P) |
| | Drive Installed Date | 3:00am, March 1st, 2003 |
| | WORM Protection | No |
| | Retention Period | No |

Figure 17: Data Descriptor

| | | |
|---|---|---|
| Descriptor ID | RID_00000003 | |
| Relationship | Archive | |
| Original | GID_00000003 | 241 |
| Archive Data | GID_00000004 | |
| Archive Time | 4:00am, April 24$^{th}$, 2004 | |
| WORM Protection | Yes | |
| Retention Period | 3 years, 1 year and 129 days remaining | |

Figure 18: Relationship Descriptor for Archive (Case 1)

| | | |
|---|---|---|
| Descriptor ID | RID_00000002 | 242 |
| Relationship | Backup | |
| Original | GID_00000006<br>GID_00000007 | |
| Backup | GID_00000008 | |
| Backup Time | 3:00am, April 24$^{th}$, 2004 | |
| Backup Type | Full Backup | |
| Backup Speed | 1GBytes per minute | |
| Succeeded | Yes | |
| Consistency Check | Yes | |
| Next Backup Time | 4:00am, April 25$^{th}$, 2004 | |

Figure 19: Relationship Descriptor for Backup

| Descriptor ID | RID_00000004 |
|---|---|
| Relationship | Replication |
| Original | GID_00000001 |
| Replication | GID_00000006 |
| Replicated Time | 5:00am, April 24th, 2004 |
| Replicated Mode | Synchronous |
| Remote Copy Link | 1Gbps network |
| Path | FC Route Information |
| Performance | 20MBytes per second avg.<br>34MBytes per second peak |
| Side File Size | 15MBytes avg.<br>20MByes peak |

243

Figure 20: Relationship Descriptor for Replication

Figure 21: Relationship Descriptor for Application
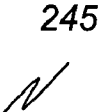
Figure 22: Relationship Descriptor for Archive (Case 2)

Figure 23: Discovered Configuration Table

| GID | Storage | LDEV | Relative Path Name |
|---|---|---|---|
| 0001 | Storage A | LDEV1 | File_A |
| 0002 | Storage A | LDEV1 | File_B |
| 0003 | Storage A | LDEV1 | File_C |
| 0004 | Storage B | LDEV2 | File001 |
| 0005 | Storage B | LDEV2 | File002 |
| 0006 | Storage D | LDEV4 | Stream_Y |
| 0007 | Storage C | LDEV3 | File_A |
| 0008 | Storage C | LDEV3 | File_B |

Figure 24: Discovered Data Table

| RID | Relationship | Source | Destination |
|---|---|---|---|
| 0001 | Application | GID_0001<br>GID_0002<br>GID_0003 | N/A |
| 0002 | Backup | GID_0007<br>GID_0008 | GID_0006 |
| 0003 | Archive (File) | GID_0003 | GID_0005 |
| 0004 | Replication | GID_0001 | GID_0007 |
| 0005 | Replication | GID_0002 | GID_0008 |
| 0006 | Archive (Message) | GID_0001<br>GID_0002<br>GID_0003 | GID_0004 |

Figure 25: Discovered Relationship Table

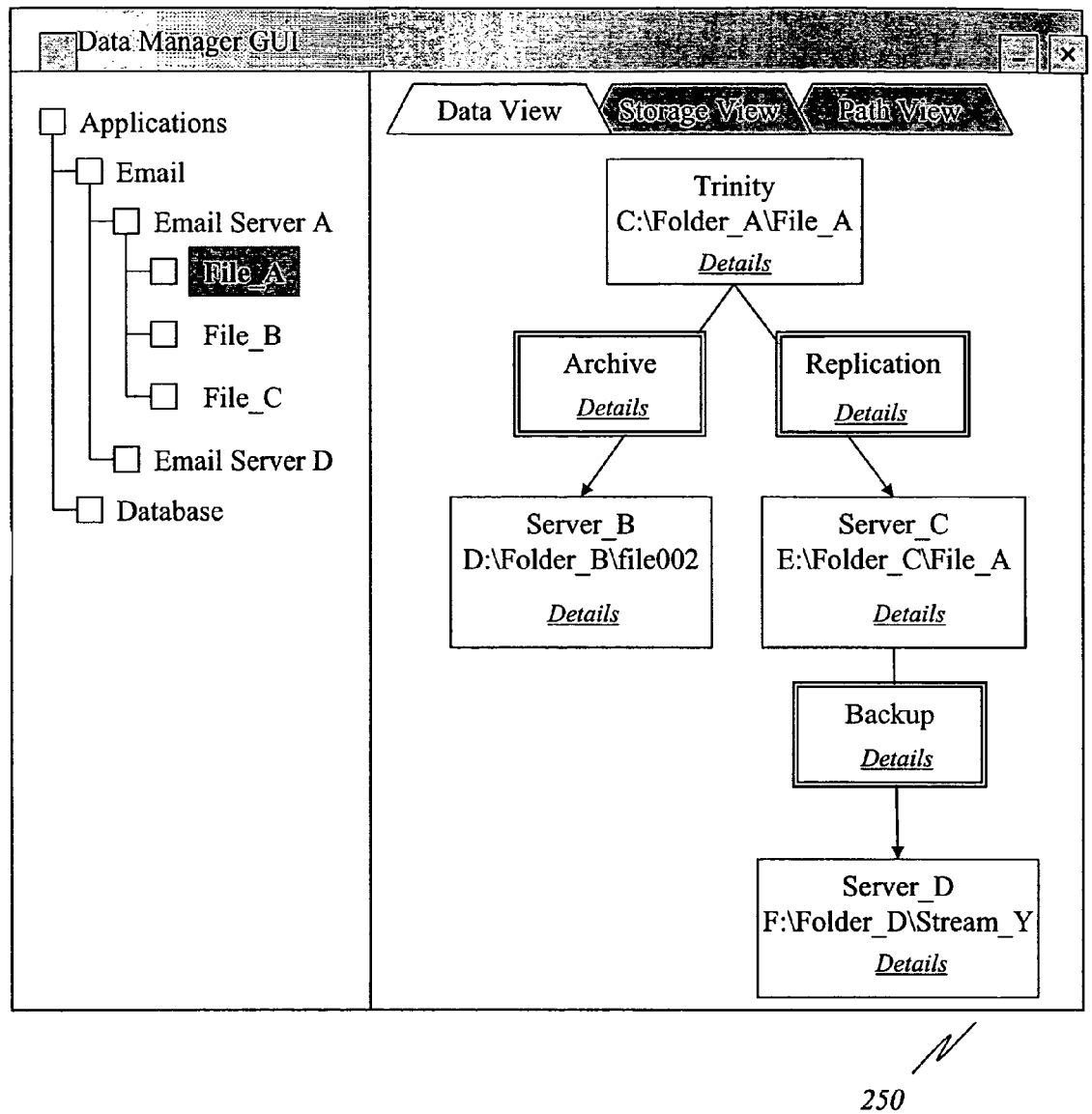
Figure 26: Data View GUI

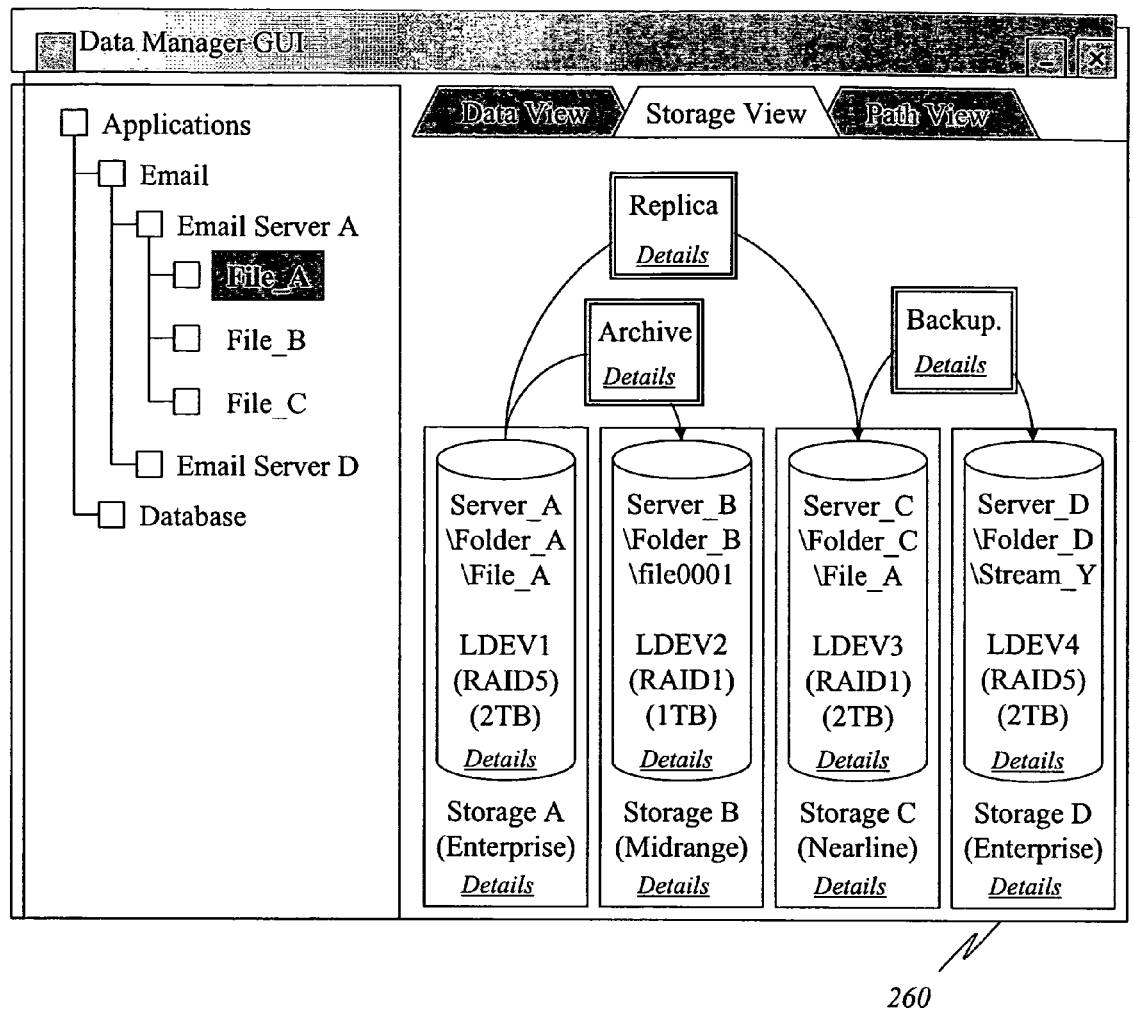
Figure 27: Storage View GUI

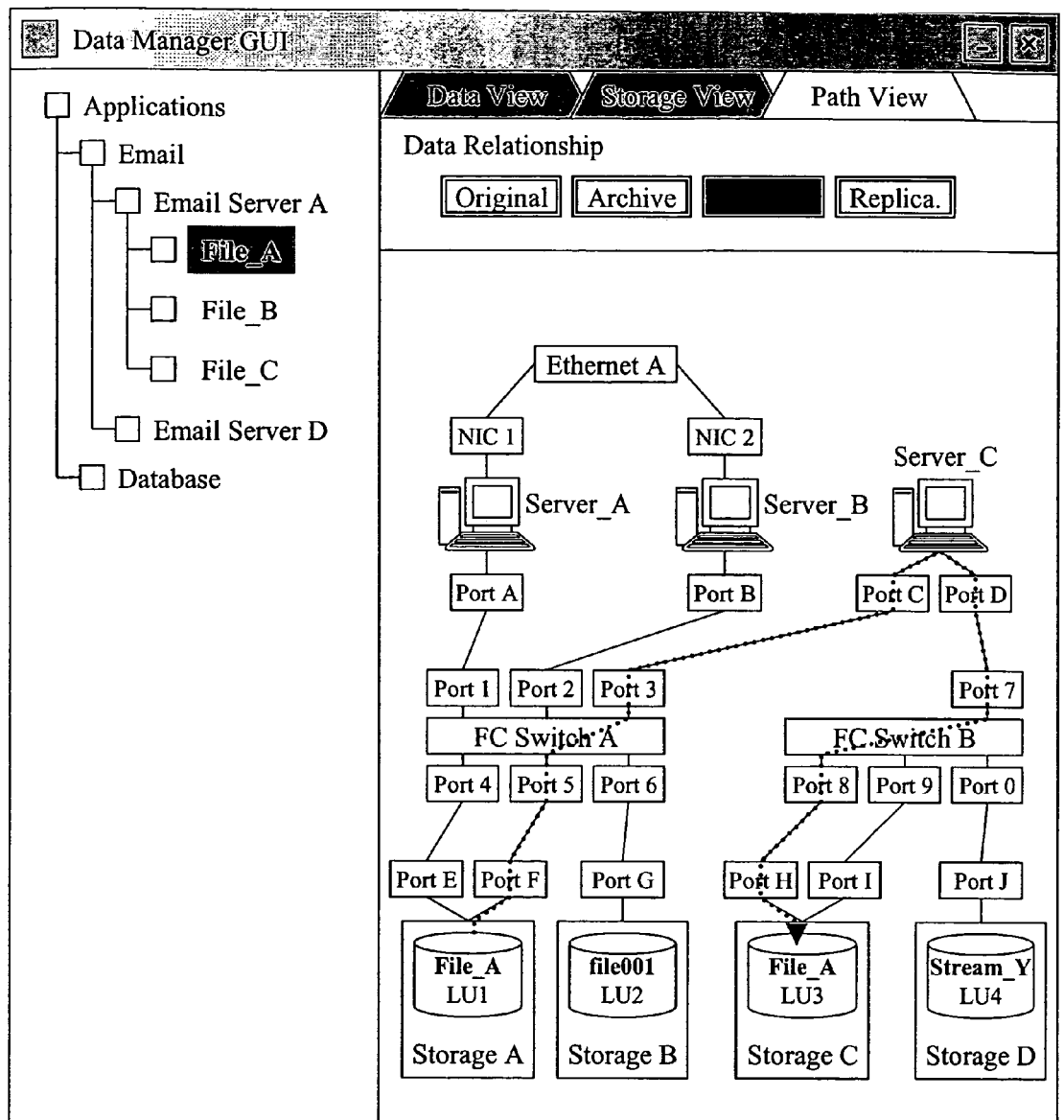
Figure 28: Path View GUI

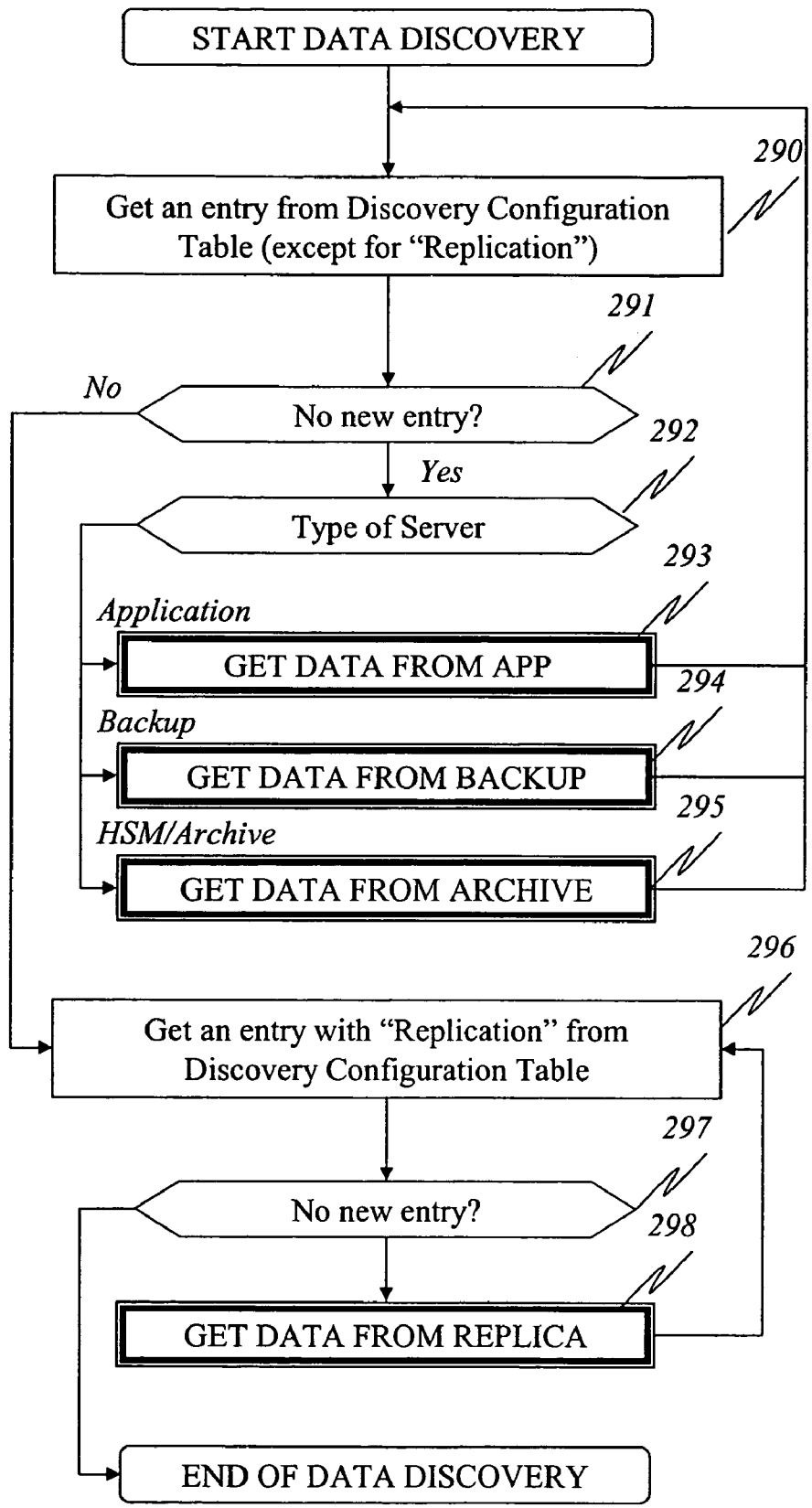
Figure 29: Data Discovery Process

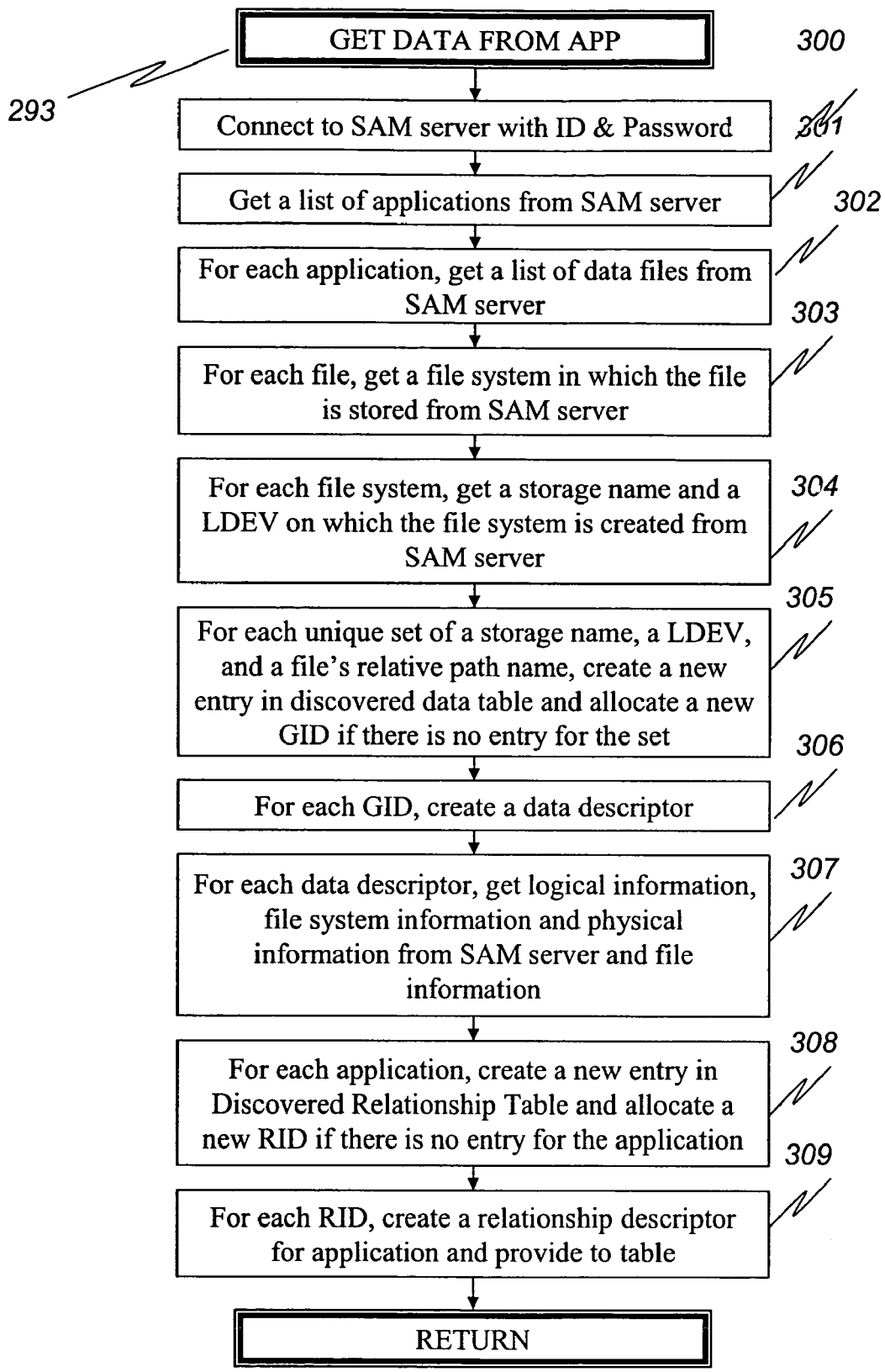
Figure 30: GET DATA FROM APP

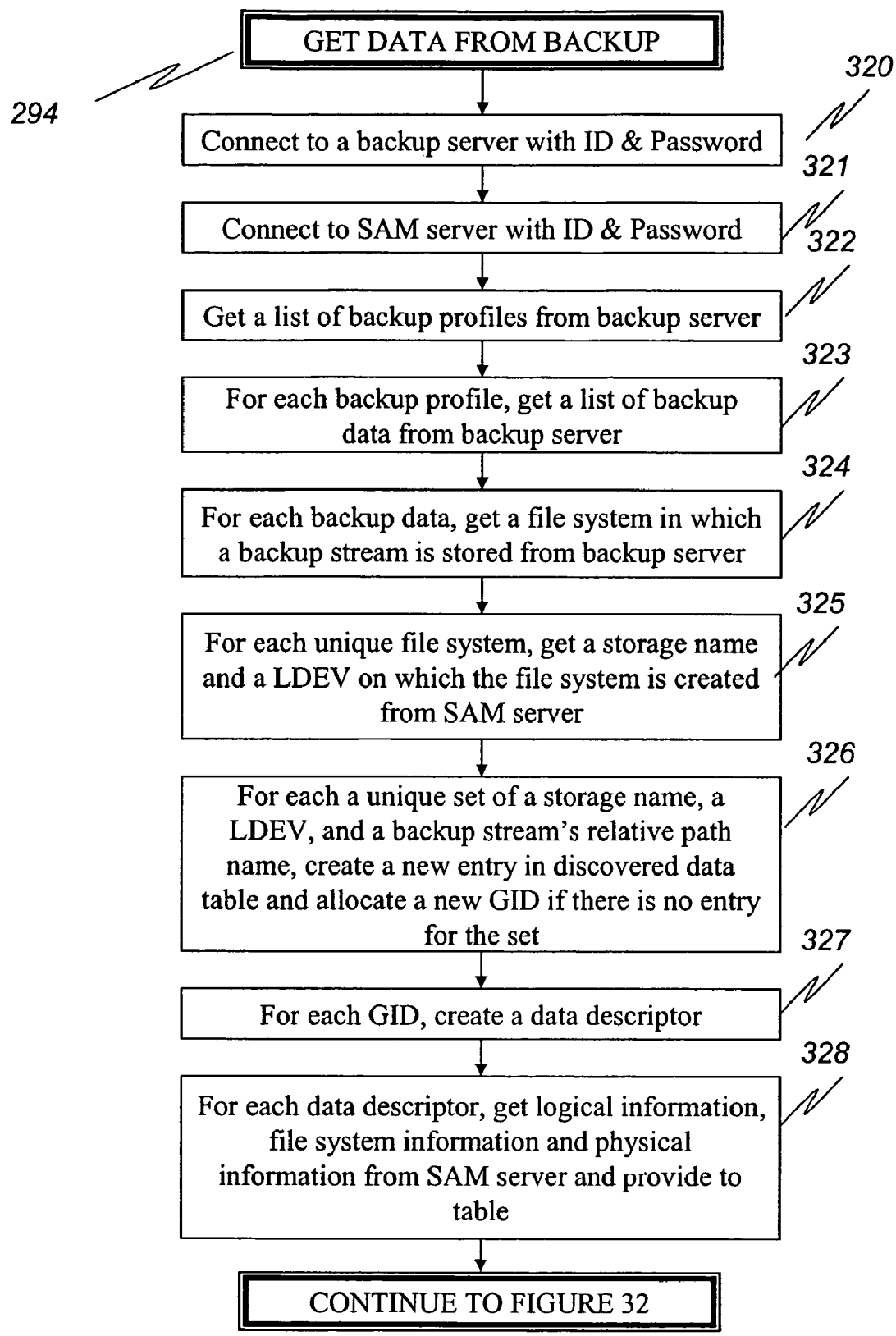
Figure 31: GET DATA FROM BACKUP

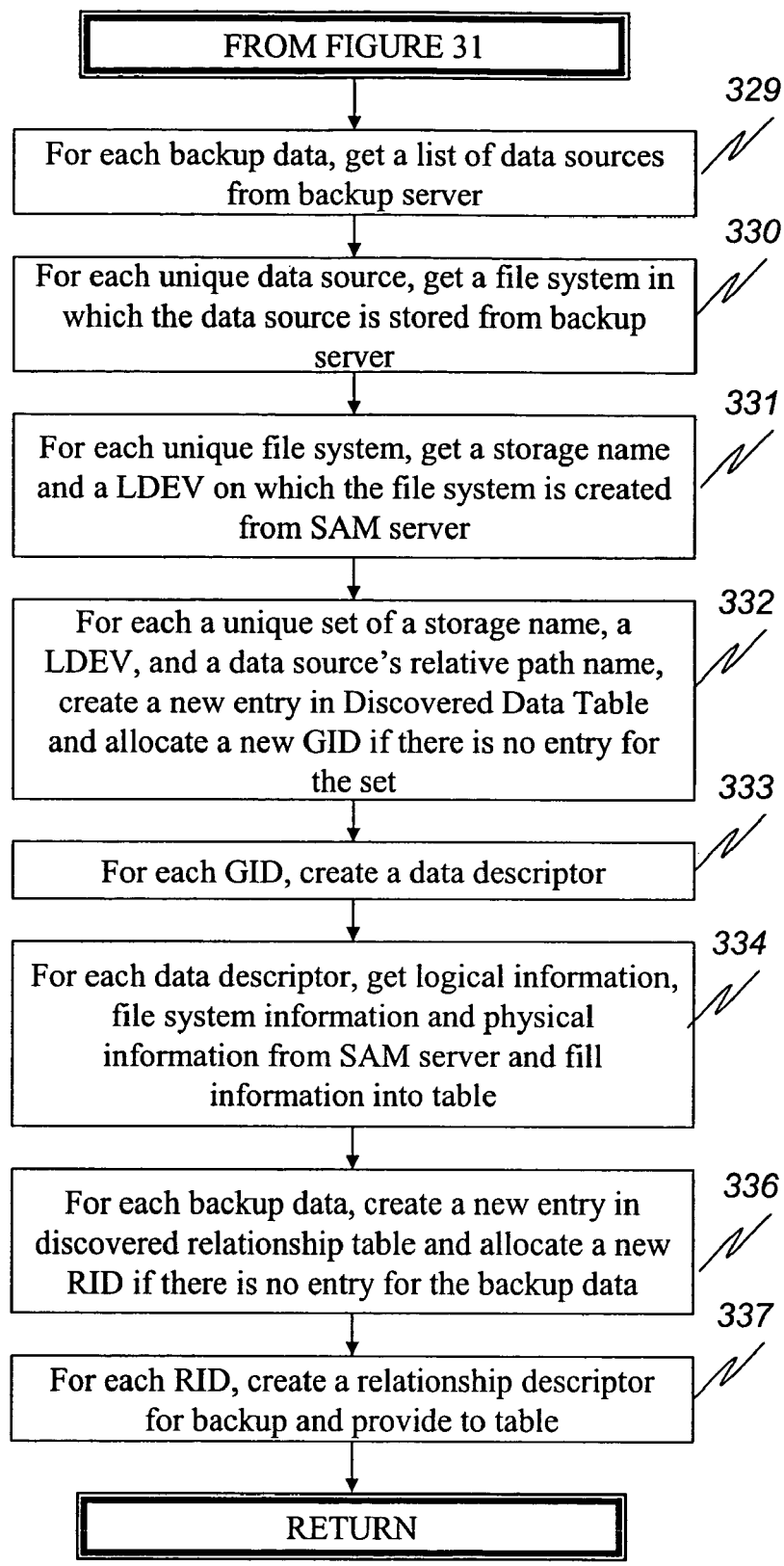
Figure 32: GET DATA FROM BACKUP (continued)

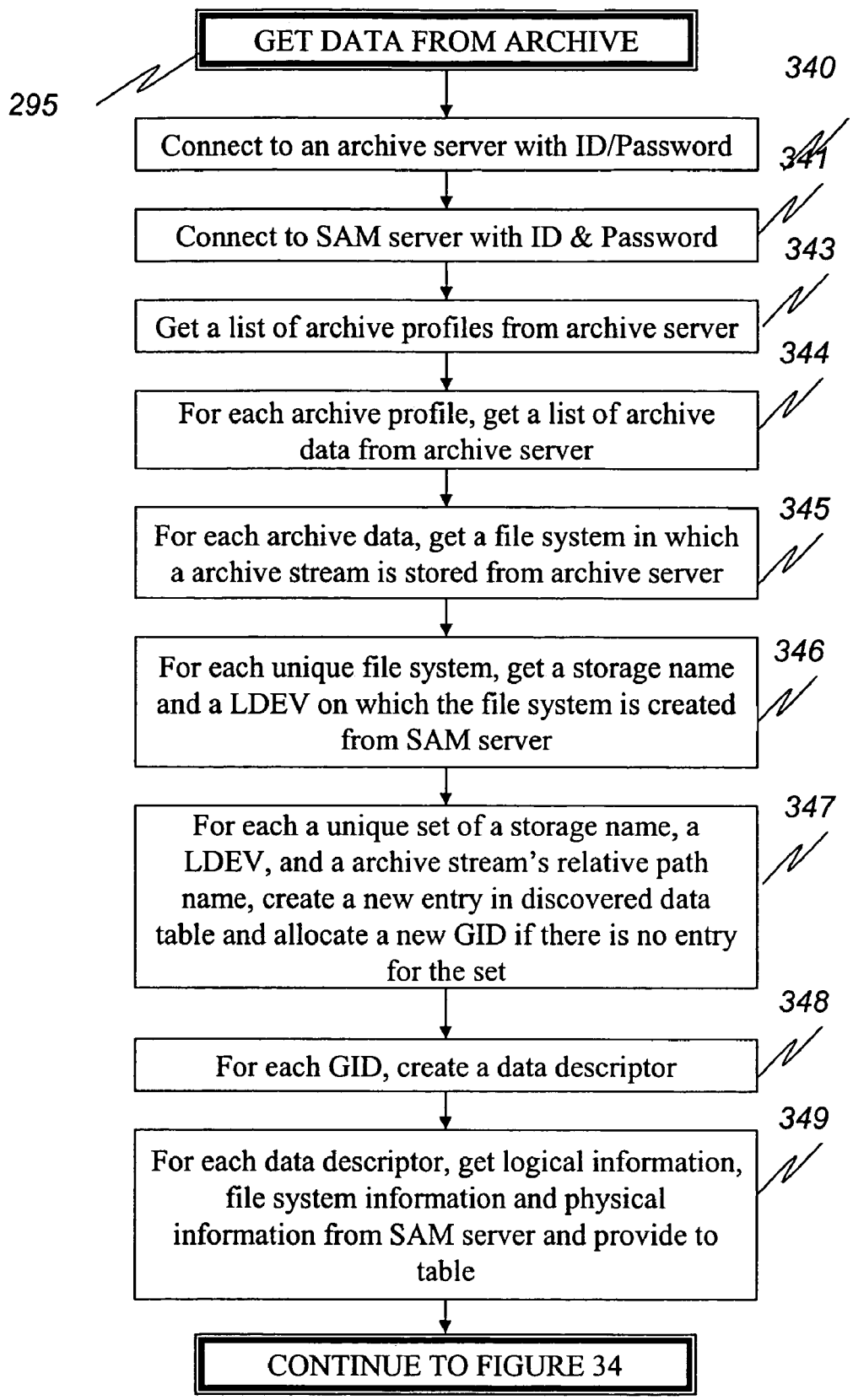
Figure 33: GET DATA FROM ARCHIVE

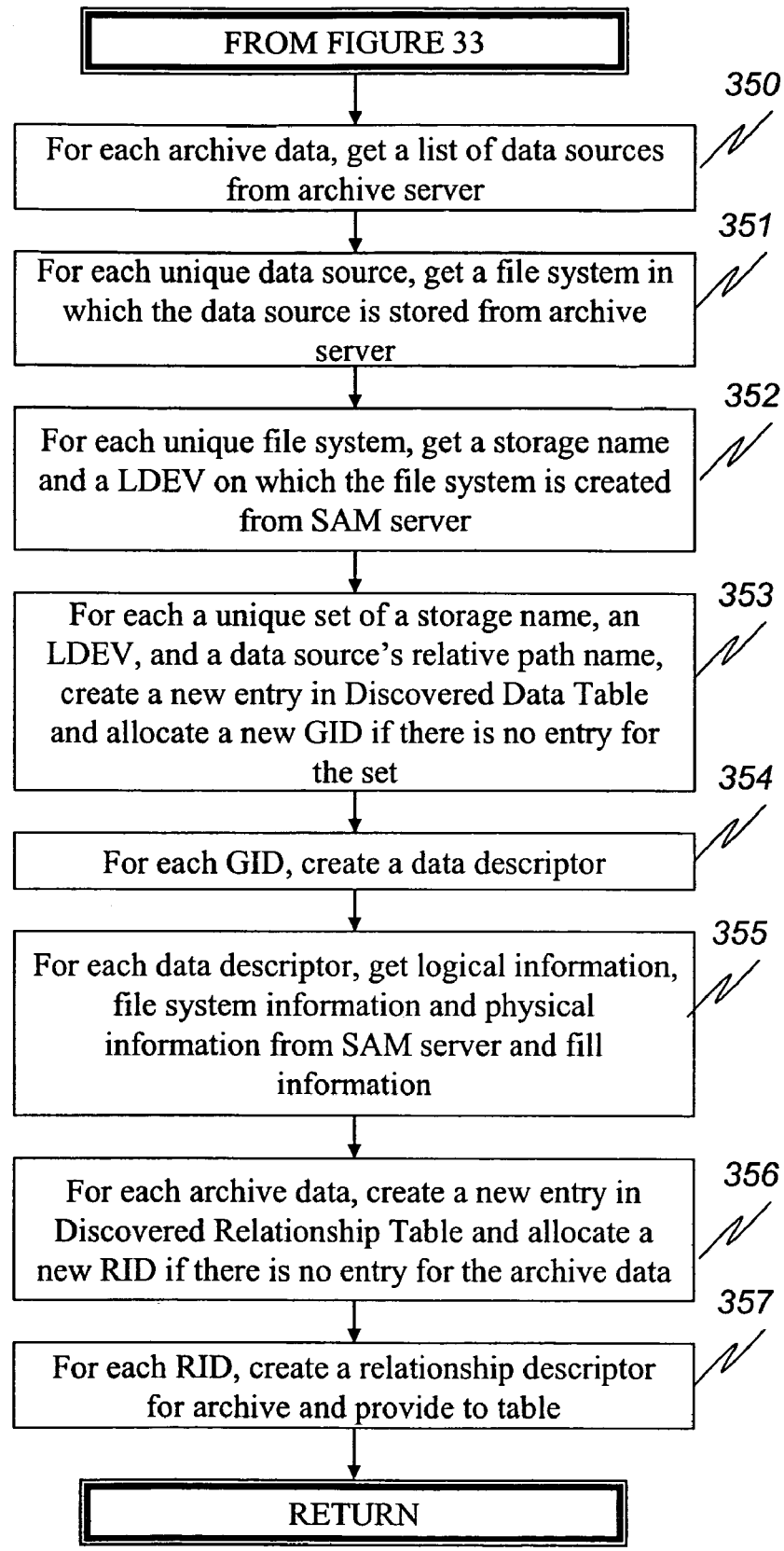
Figure 34: GET DATA FROM ARCHIVE (continued)

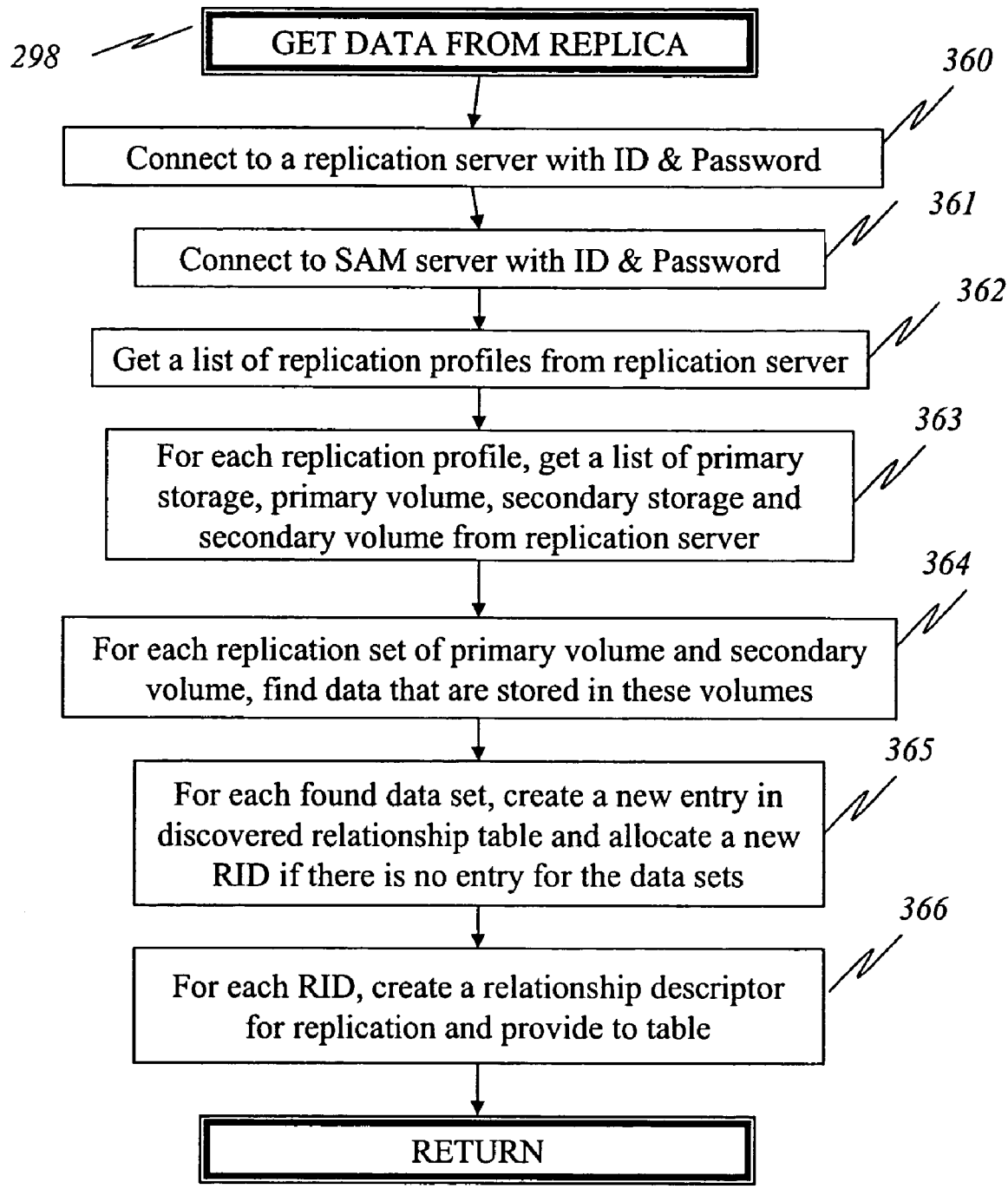
Figure 35: GET DATA FROM REPLICA

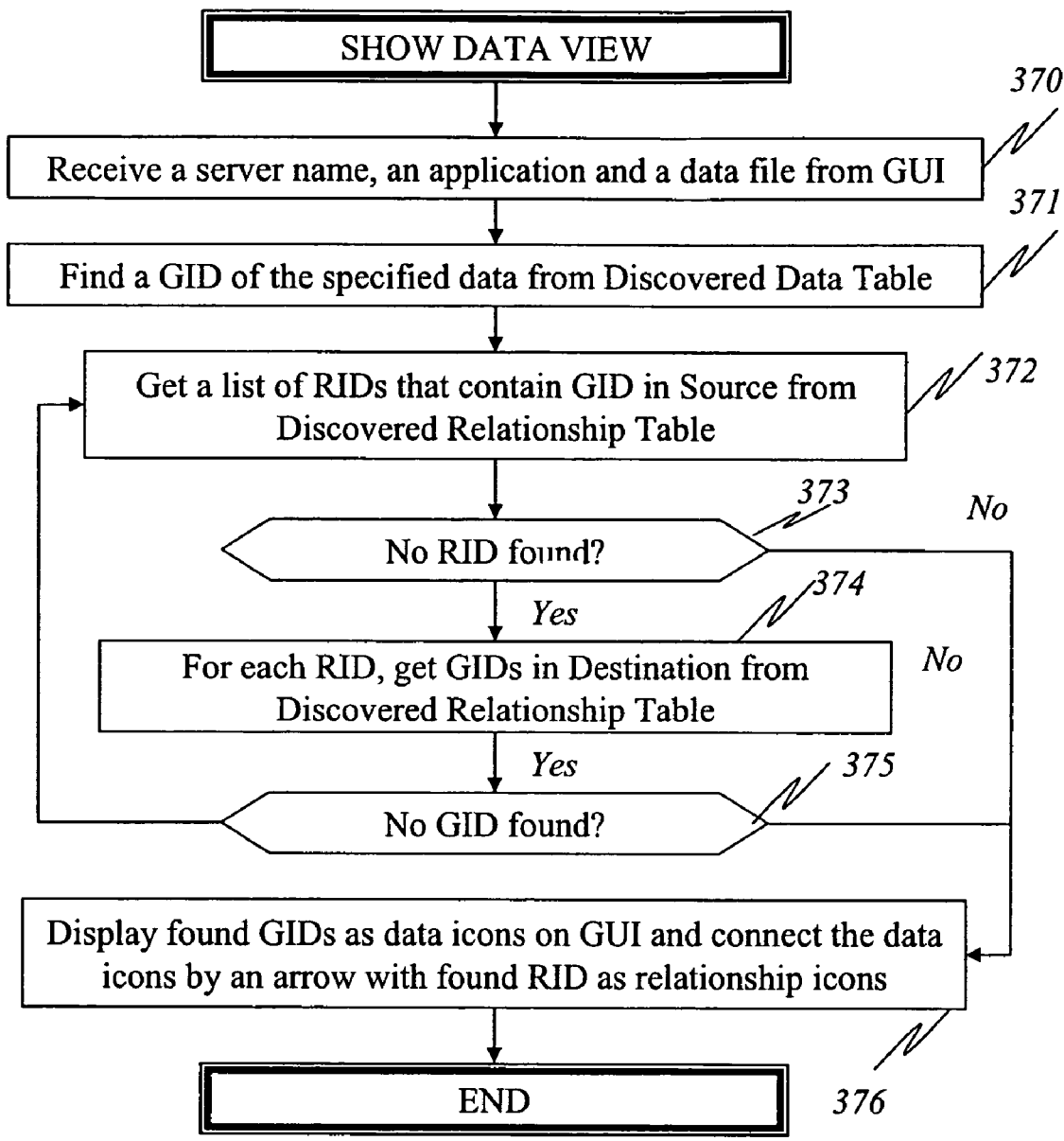
Figure 36: SHOW DATA VIEW

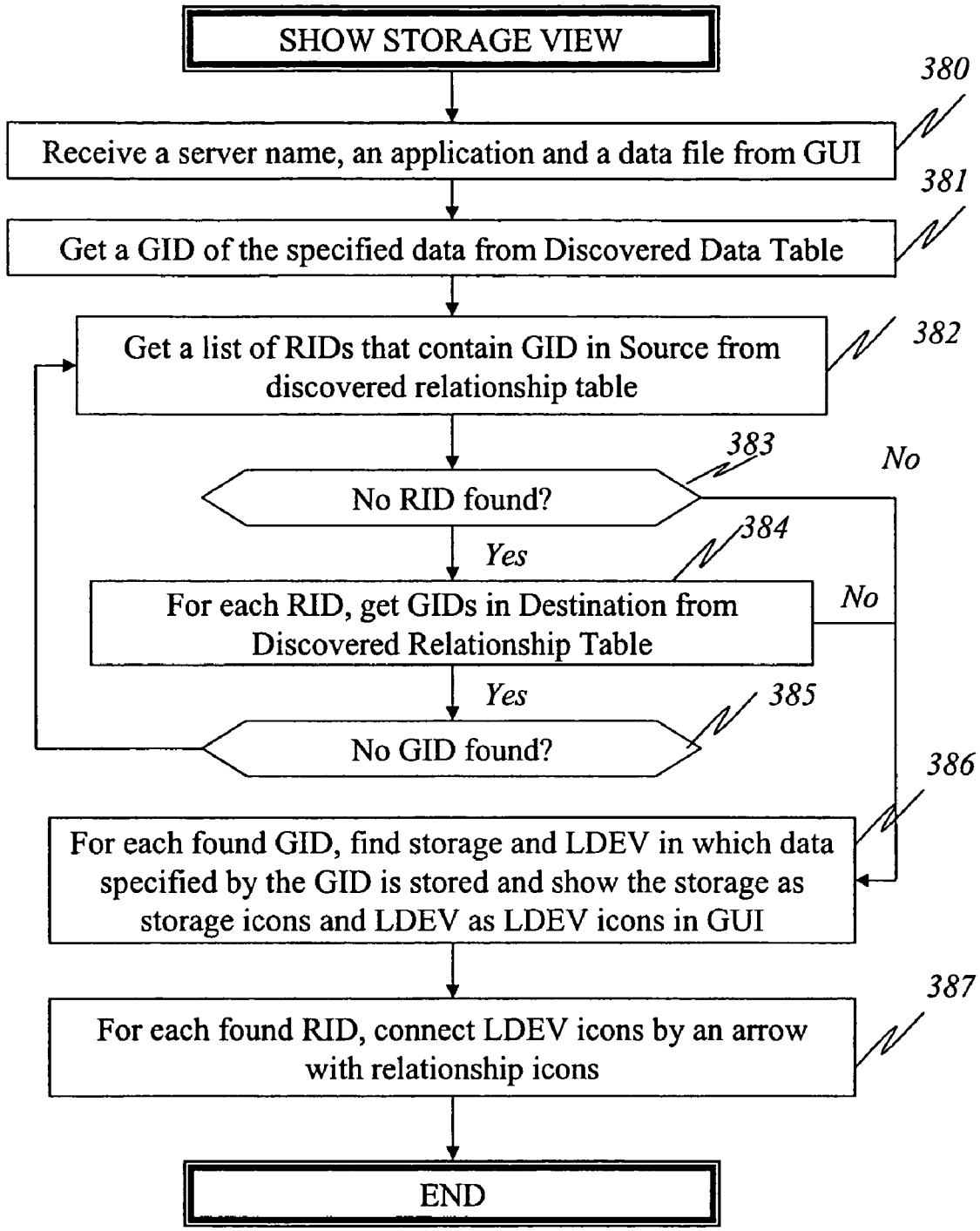
Figure 37: SHOW STORAGE VIEW

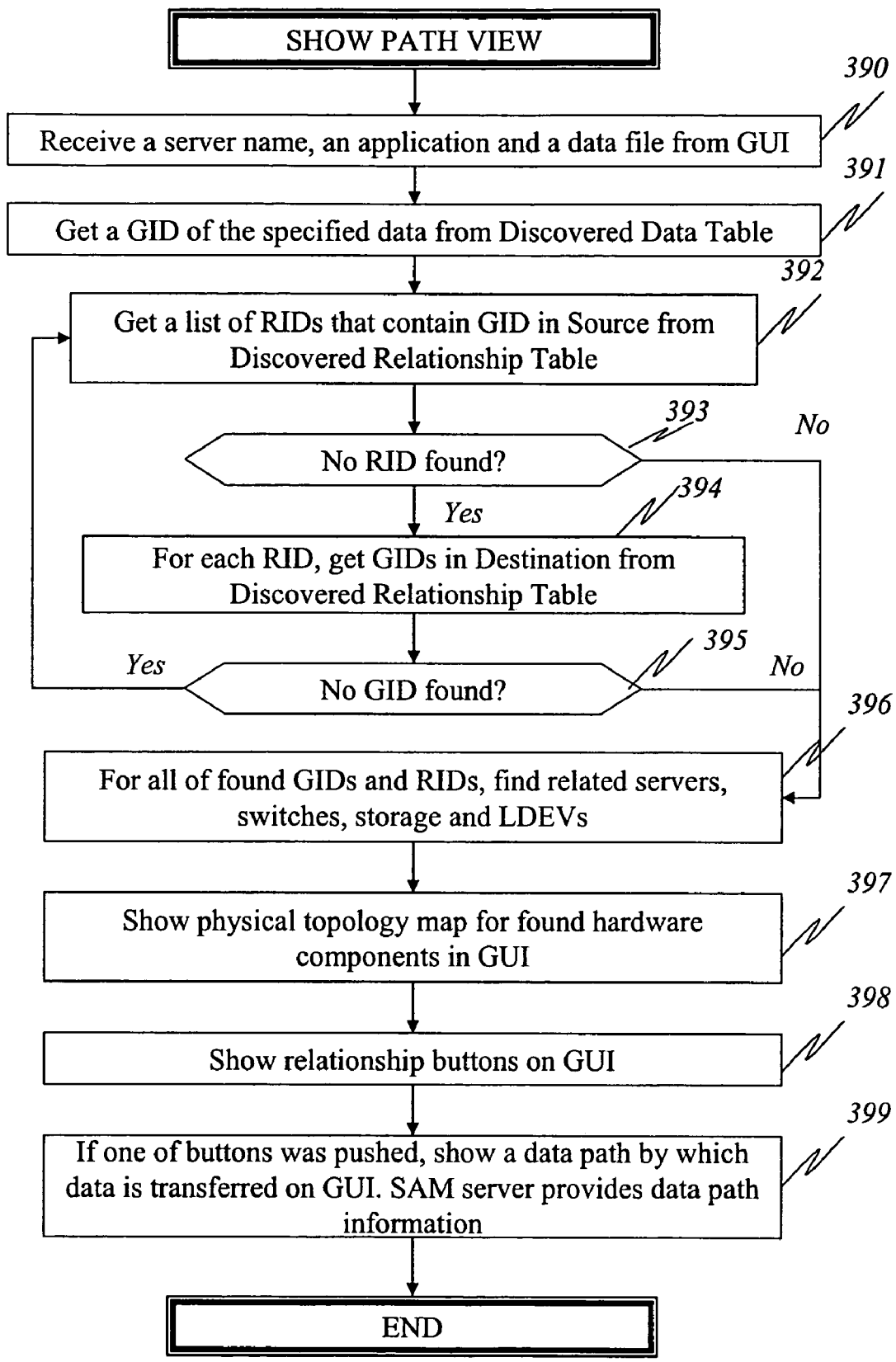
Figure 38: SHOW PATH VIEW

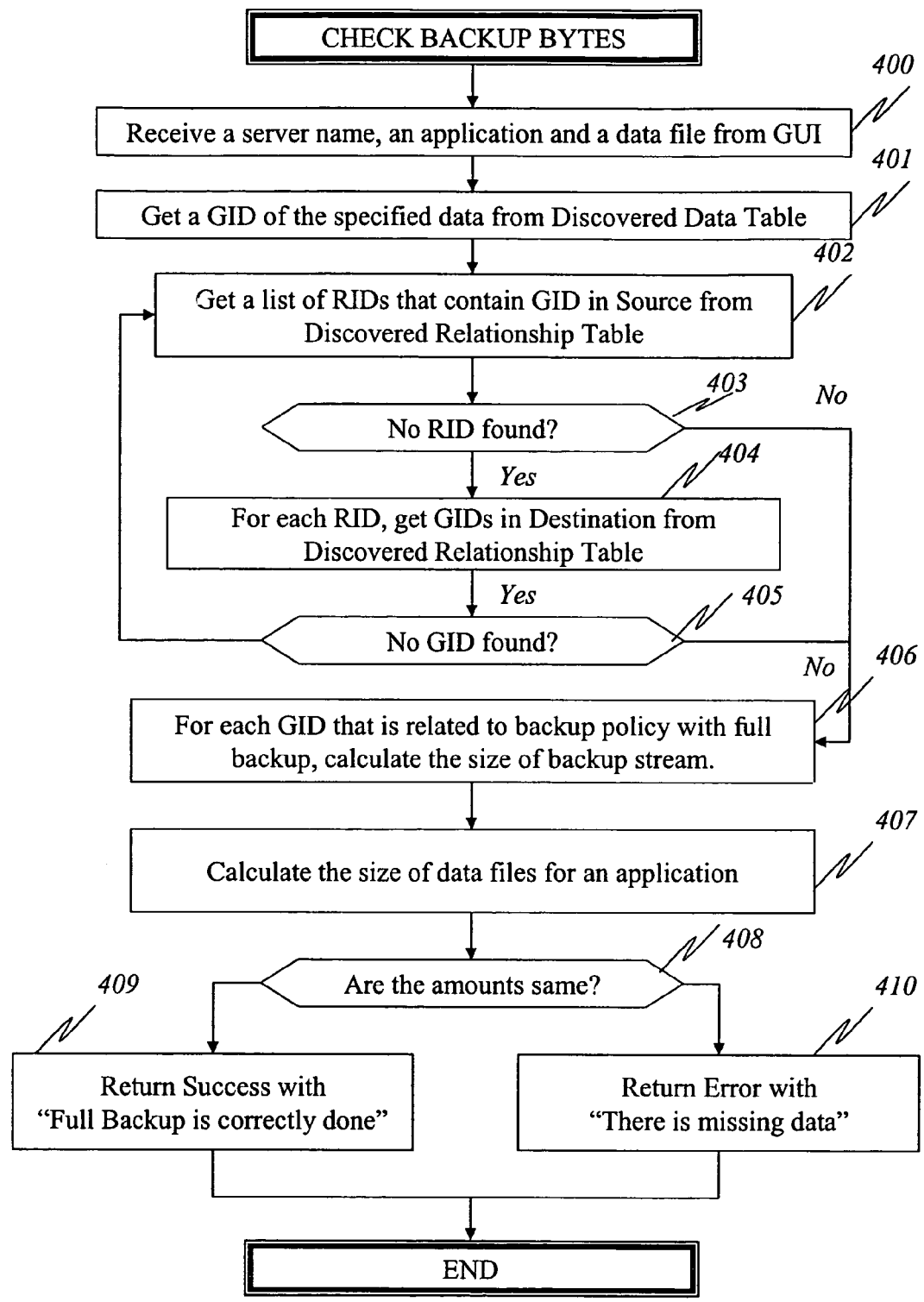
Figure 39: CHECK BACKUP BYTES

DATA MANAGEMENT SYSTEM

BACKGROUND OF THE INVENTION

This invention relates to systems for storing data, and in particular to storage systems in which data is distributed among large numbers of hard disk drives or other storage media.

In a typical data storage network, data from many different applications is stored and retrieved, and it is difficult to track the relationships among all of the data stored. For example, in an e-mail system, an e-mail server generates original data and provides it to a storage system. An archive server may archive some parts of the data to different parts of the storage system or to different storage systems. At the same time a replication server may replicate the original data to different storage, and the data may be backed up by a backup server to yet further storage. While each of these data handling processes operate on the data associated with that process in an appropriate manner, the archive server, the replication server and the backup server each operate independently. Each has its own catalog or other mechanism for managing how the data is stored and retrieved. Because of the distributed nature of the system and the lack of consolidated catalogs, a user of a storage system typically cannot understand where data is situated in that storage system on a reliable basis.

Furthermore, the complexity of storage systems increases the probability of mistakes. In the example just described, some parts of the original data are not stored in the original storage, but instead have been stored in the archive storage. As a result, a replication of the original data will not contain the archive data. Thus the backup data will also not contain the archive data. Therefore, when a user restores data from the backup, because the backup data is not a complete backup of the original data, not all of the original data will be restored. All of this complexity makes managing the data in a coherent manner difficult and error-prone.

There are a few tools that help manage data in storage systems. These tools, however, do not address the issues mentioned above. One commercially available tool for use in management of a data storage system is provided by Veritas (™) and referred to as SANPoint Control. This system enables keeping track of the hardware devices and their relationships in a storage area network. Another commercially available tool is provided by AppIQ and known as storage authority suite. This system provides information about the hardware in the storage system, including hosts, bus adapters, switches, disk subsystems, etc. It also provides capabilities for management of particular applications running on the storage system, for example, Oracle databases, file servers, etc.

Another commercially available tool for use in storage systems is the Aptare Storage Console. This application software provides increased reliability for backup and restore operations in a storage system. The Storage Resource Broker from Nirvana is software that enables users of systems to share and manage filed stored in various locations. It provides various searching and presentation functions to enable users to find particular files or information stored in various portions of large data storage units.

Therefore, a system is needed which enables a user of the system to have a complete view of the data handling processes and the relationships among processes for management of the data to reduce the chance of error and improve the efficiency with which the data is managed.

BRIEF SUMMARY OF THE INVENTION

A system according to this invention provides a method for collecting information about data and data handling processes from different types of data applications. This invention enables a user of the system to appreciate relationships among the data. It shows the data in a system view and can illustrate the relationships among the data stored in the system with a graphical user interface. Preferably, in a storage system having arrays of storage devices for storing information, a data manager according to this invention collects information about the relationships among data and files stored therein and presents them to a user.

In a preferred embodiment, the graphical user interface provides the user with the option of choosing from among three different views of data handling processes. These include a data view which illustrates how data are related to each other, for example, by showing where a particular file has been archived, replicated, or backed up. Preferably the system also provides a storage view which illustrates how the data volumes are related, for example, indicating which volumes in the storage system have the original data, the archived data, replica data, and backed up data.

A third view for information in the storage system is referred to as the path view. The path view illustrates how data is transferred through the system by various data handling processes, for example indicating which ports, switches, and storage handle particular files or other data. Furthermore, a system according to this invention provides a way to detect erroneous configurations of backup data by comparison of the amount of backup data with the amount of original data.

In one embodiment, a storage system having a replication server, a backup server, and an archive server further includes a data manager which tracks the stored data in at least two of three approaches. In one approach the stored data is tracked by presenting file name relationships among the replicated, backup, or archived copies of the stored data. In the second approach, the physical locations within the storage system, for example, in terms of volumes, are presented. In the third approach, path information depicting the processes by which the data arrived at its storage location are provided for the replicated, backup, or archived copies of the stored data.

BRIEF DESCRIPTION OF THE DRAWINGS

FIG. 1 is a block diagram illustrating a system configuration for a typical storage area network including a data manager according to this invention;

FIG. 2 illustrates an archive catalog for an archive profile;

FIG. 3 illustrates an archive catalog for media information;

FIG. 4 illustrates an archive catalog for archived data;

FIG. 5 illustrates a backup catalog for a backup profile;

FIG. 6 illustrates a backup catalog for media information;

FIG. 7 illustrates a backup catalog for backup data;

FIG. 8 illustrates a replication catalog;

FIG. 9 illustrates a device catalog for a volume;

FIG. 10 illustrates a device catalog for storage;

FIG. 11 illustrates a device catalog for a file system;

FIG. 12 illustrates a device catalog for a path;

FIG. 13 illustrates a device catalog for an application;

FIG. 14 illustrates an archive catalog for an archive profile;

FIG. 15 illustrates an archive catalog for archived data;

FIG. 16 is a block diagram of one example of interconnections in a storage system;

FIG. 17 illustrates a data descriptor;

FIG. 18 illustrates a relationship descriptor for archived data;

FIG. 19 illustrates a relationship descriptor for backup data;

FIG. 20 illustrates a relationship descriptor for replication data;

FIG. 21 illustrates a relationship descriptor for application data;

FIG. 22 illustrates another relationship descriptor for archived data;

FIG. 23 illustrates a discovered configuration table;

FIG. 24 is an example of a discovered data table;

FIG. 25 is an example of a discovered relationship table;

FIG. 26 is an example of a GUI for a view of the data;

FIG. 27 is an illustration of a GUI for a view of the storage system;

FIG. 28 is an example of a GUI for a view of the path information;

FIG. 29 illustrates a process for data discovery;

FIG. 30 illustrates details of the Get Data From App process shown in FIG. 29;

FIG. 31 illustrates details of the Get Data From Backup process shown in FIG. 29;

FIG. 32 illustrates further details of the Get Data From Backup process shown in FIG. 29;

FIG. 33 illustrates details of the Get Data From Archive process shown in FIG. 29;

FIG. 34 illustrates further details of the Get Data From Archive process shown in FIG. 29;

FIG. 35 illustrates details of the Get Data from Replica process shown in FIG. 29;

FIG. 36 is a flow chart illustrating the steps for depicting the data view;

FIG. 37 is a flow chart illustrating the steps for depicting the storage view;

FIG. 38 is a flow chart illustrating the steps for depicting the path view; and

FIG. 39 is a flow chart illustrating the steps for checking backup operations;

DETAILED DESCRIPTION OF THE INVENTION

FIG. 1 is a block diagram illustrating a hypothetical typical storage system as might be found in a complex computing environment. Most of the components of the system shown in FIG. 1 are well known and thus are discussed only briefly herein. The data manager 111, however, is not well known and is explained in detail below.

The system shown in FIG. 1 includes two application servers 101 and 102. These servers run computer programs 101a and 102a to provide computing resources to users of the overall system. By execution of a stored program, the applications 101a and 102a generate data which is stored in the system illustrated in FIG. 1.

A replication server 103 replicates data to different storage systems or volumes within the storage system to provide well known mirroring functionality. The replication server maintains a replication catalog 106 as will be discussed below. Similarly, a backup server 104 provides data backup functionality to enable restoration of data at a later date should there be hardware, software, or facilities failures. A backup catalog 107 maintains a record of the backup operations, as also discussed below.

Many large storage systems also include a hierarchical storage manager or archive server 105. Server 105 archives little used data from primary storage areas to secondary storage areas to provide improved system performance and to reduce costs by maintaining the data on lower cost media. As with the other servers, archive server 105 maintains an archive catalog 108, also explained further below. Although servers 101–105 have been discussed as though each were a standalone hardware implementation, this is not necessary. The servers may be implemented as separate processes running on a single large computer, or as separate processes running on separate processors within a connected array of computers.

The system shown in FIG. 1 also includes a storage area manager 109. The storage area manager is preferably a management server that manages the entire network depicted in FIG. 1, including the servers and the storage systems 115, 116, and 117. The storage area manager maintains a device catalog 110 which is also discussed below. In essence, the storage area manager can retrieve information from the switches 114, servers 101 . . . 105, storage systems 115–117, and the applications 101a, 102a. Storage area managers such as depicted in FIG. 1 are often implemented using a standard protocol such as DMTF's CIM. Another way to implement the storage area manager is to install an agent on the server and have the agent collect information about the server locality and provide it to the storage area manager.

Although there are a variety of techniques commonly used to interconnect systems such as depicted in FIG. 1, switches 114 have become an increasingly popular connection technique. These switches are typically switches based on Fibre Channel, Ethernet, or broadband technology.

The data received by the system or generated by the system as the result of its server operations is stored in storage systems such as 115, 116, and 117. Each such storage system includes a disk controller 118, 119, and 120, respectively, as well as hard disk drives 118a . . . 120b for storing data. For simplicity FIG. 1 illustrates only two disk drives per storage system. In conventional implementations, however, hundreds of disk drives may be employed in the storage system. The disk controllers 118, 119 and 120 control input and output requests issued from the servers to store and retrieve data from the hard disk drives.

For illustration three different types of storage systems are shown in FIG. 1. Storage system 115 is an enterprise Fibre Channel storage system. Such systems typically support SCSI as a data protocol between the servers and the storage systems. The Nearline PC storage system 116 operates in a similar manner, however, using ATA format hard disk drives. Finally, the Network Attached Storage system 117 supports NFS and CIFS as file protocols. Thus, as depicted in FIG. 1, the system of this invention can be applicable to any type of storage system.

The components and systems shown in FIG. 1 are interconnected using two techniques. A network 100 is provided, for example based on TCP/IP/Ethernet to provide "out of band" communications. The main data handling, however, for the storage systems is provided by switches 114 which allow interconnections of desired components as necessitated by the particular operations to be performed.

The system of this invention adds an additional component 111, referred to herein as a data manager, to the overall system of FIG. 1. This data manager communicates with the other components via the local area network 100 and the switches 114. The data manager functions to collect data handling process information from the applications and the data applications and present the results to a user. The results are typically presented through a graphical user interface running on a console 113. The data manager maintains a data catalog. The data catalog enables the data manager to present to the user various "views" of the storage system. For example, the data manager 111 and data catalog together enable a user to view information about the physical locations where various files are stored, the path by which the information was stored, and other relationships among the data stored in the storage systems 115, 116, and 117. The data manager 111 creates and manages data descriptors, relationship descriptors, a discovered data table (discussed below) and a discovered relationship table (also discussed below). These tables are typically stored in local storage or network storage attached to the data manager. The data manager also uses a discovery configuration table as discussed below. The data manager itself may be configured by the console 113. The data manager relies upon catalogs created and stored throughout the system as designated in FIG. 1. These catalogs are discussed next.

FIG. 2 is a diagram illustrating an archive catalog for the archive profile. This catalog is included within the catalog 108 shown in FIG. 1. The catalog 200 shown in FIG. 2 describes which data is to be archived, at what time, and to which storage. In the example shown in FIG. 2 the data is to be archived if it is not accessed within 30 days. The data to be archived is set forth as the Folder, and the media to which it is to be archived is listed under Archive Media.

FIG. 3 illustrates an archive catalog for media information. This catalog is also included within catalog 108 shown in FIG. 1. The example in FIG. 3 illustrates that the Archive Media is actually an Archive Folder having a specified address associated with the specific server. FIG. 3 also indicates that the Folder has a maximum capacity as shown.

FIG. 4 is a diagram illustrating an archive catalog for archive data. This catalog is included within catalog 108 shown in FIG. 1. In the example of FIG. 4, the indicated Source Data is shown as being archived at the designated media location as an Archive Stream at the Archive Time shown in FIG. 4.

FIGS. 5–7 illustrate backup catalogs stored as catalog 107 in FIG. 1. In FIG. 5, an exemplary backup catalog for a backup profile is illustrated. This catalog describes how and when data is to be backed up. In the example depicted, files under the folder designated by Source are to be backed up to the Backup Media at the Backup Time stated. The Backup Type indicates that all files are to be backed up, while the Next Backup Time indicates the time and date of the next backup operation.

FIG. 6 is a diagram illustrating a backup catalog for media information. In a similar manner to FIG. 3, it illustrates the physical location of the particular media designated, as well as its capacity.

FIG. 7 illustrates a backup catalog for backup data. This catalog describes when and where data is backed up. In the example shown, two files as designated by Data Source have been backed up to the Backup Media at the time shown.

FIG. 8 is a diagram illustrating a replication relationship between two devices in the storage system, and is referred to as a replication catalog. This diagram provides additional information with regard to the replication catalog 106 in FIG. 1. The replication catalog describes the relationship between two data storage locations, commonly known as LDEVs in the storage system. As shown by FIG. 8, the data in the Primary Storage is replicated to the Secondary Storage location. The Mode indicates whether the backup is to be synchronous or asynchronous.

FIG. 9 is a diagram illustrating a device catalog for a volume, with FIGS. 10–13 illustrating other device catalogs, all incorporated within catalog 110 in FIG. 1. The volume catalog 207 shown in FIG. 9 includes the volume identification, name, address, port, logical unit number, etc.

FIG. 10 illustrates a device catalog 208 for storage. This catalog provides information about a storage system. As shown, the catalog includes an identification, name, address, capacity, information about ports coupled to the storage, etc.

FIG. 11 illustrates a catalog 220 for a file system. As shown there, the catalog includes information about identification, physical volume location, file system type, free space, etc. Similarly, FIG. 12 illustrates a device catalog for a path 221. This catalog includes identification information and worldwide name identification.

FIG. 13 is a device catalog 222 for an application. As shown by FIG. 13, the catalog includes identification, application type, host name, and associated data files.

FIGS. 14 and 15 illustrate an archive catalog for message based archiving. (FIGS. 2–4 illustrated archive catalogs for file-based archiving.) In message based archiving, the archiving is performed at an application level. For example, an e-mail server may store messages into data files and an archive server then communicates with the e-mail server to archive the messages themselves, instead of the data files. In these circumstances, the archive profile also indicates the name of a server and the name of an application.

FIG. 14 illustrates an archive catalog 223 for an archive profile for the case just described. As shown, the application is indicated with A as well as the media name MN, and the media and timing information. The media information itself may be archived in the same manner as described in conjunction with FIG. 3.

FIG. 15 illustrates an archive catalog 224 for archive data. As mentioned above, the Source Data designates particular messages instead of files. The Server Name and information about the media, data, and time are also provided.

FIG. 16 depicts an exemplary system configuration which is used in the remainder of this application as an example to clarify the explanation. As shown in FIG. 16, several servers 230 are represented across the upper portion of the diagram, including an application server, an archive server, a backup server, and a replication server. Two of the servers are connected with an Ethernet link. In the middle portion of the diagram, two switches 231 couple the various servers to various storage systems 232. The replication server is coupled to the Enterprise Storage A to allow replication in that storage system. The application server 230 stores data into LDEV1, while the archive server archives some of that data into LDEV2. The replication server asks storage unit A to replicate LDEV1 to LDEV3, and in response that event occurs. The backup server backs up data from LDEV3 to LDEV4.

In a conventional system without the data manager described in conjunction with FIG. 1, the various catalogs described above are all separated and the user is not able to see the total relationships of the data and files being managed by the storage system. The addition of the data manager, however, allows communication among the various servers and the data manager, for example using scripts or other well known interfaces. By communication between the data manager and the various servers these relationships may be discovered and presented to the user as discussed next.

FIG. 17 illustrates a sample data descriptor table 240. This table illustrates information collected by the data manager 111 (see FIG. 1) about the data being handled by the storage system and the servers. As shown in FIG. 17, the data descriptor table includes a considerable information for the particular unit of data discovered. It also includes logical information about the data, including for example, the host name associated with that data, the path name, the "owner" of the data, any restrictions on access or rewriting of the data, the size, time of creation, time of modification, time of last access, and a count of the number of accesses. The data descriptor also includes information about the mount point (where the data is located), the type of file system associated with the data, and the maximum size of that file system. Finally, the data descriptor includes physical information about the data, including the storage system brand name (Lightning 9900), its IP address, its LDEV, etc. The physical information can also include information about the maximum volume size, the level of RAID protection, etc.

Generally speaking, the logical information includes which server has the data, its logical location within that server, and access control information, as well as size, and other parameters about the stored data. Also generally speaking, the file system information describes the type of file system in which the data is stored. The physical information describes the storage system and the LDEVs on which a particular file system has been created.

FIGS. 18–22 illustrate relationship descriptor tables to help establish the relationships among the data stored in the storage system. FIG. 18 is an example of a relationship descriptor table 241 for the archive. The table includes information about a descriptor identification, its relationship to the original data, the original data descriptor, the archive data descriptor, the archive time and the retention period thus far. The relationship descriptor shows how the discovered data are related and assigns a unique ID (RID).

FIG. 19 provides a relationship descriptor for backup as shown there. Table 242 illustrates the original data of the specified addresses has been backed up as data specified at that address. The backup date, time, speed, and other parameters are also maintained.

FIG. 20 is a relationship descriptor table 243 for replication. This table, in addition to the other information provided, maintains the relationship between the original and the replicated data based on their global identification.

FIG. 21 is a relationship descriptor table 244 for an application. As shown by this table, the e-mail server in the Trinity server has data sources specified by the designated global identification numbers.

As shown by table 245 in FIG. 22, there is a relationship descriptor for the archive in a message based system. Because it would be resource-consuming to create a data descriptor and a relationship descriptor for each message, only the relationship between the original data and the archived data are identified in the case of message based archiving. Of course, if desired, a data descriptor could be created.

The data manager 111 also creates a number of tables based upon its interactions with the servers. These tables are referred to here as consisting of a discovery configuration table 280 shown in FIG. 23, a discovered data table 420 shown in FIG. 24, and a discovered relationship table 430 shown in FIG. 25. These tables are discussed next.

The discovered configuration table 280 shown in FIG. 23 shows from which applications and data applications the data manager has gathered information. Each entry in the table, consisting of a row, specifies a type of discovered data, a server from which the information is gathered, an application or data application name, and ID and password information to gain access as needed. For example, in the first row of table 280, an application program has collected information from server E using the application SAMSoft, and this can be accessed using the ID and password shown at the end of the row.

FIG. 24 illustrates a discovered data table 420. This table provides management information for the discovered data. As shown by the table, the data is uniquely identified by the combination of storage system, LDEV and a relative path name. Files stored in the storage system are stored using a file system. The relative path name provides a path name inside the file system instead of a path name when the file system is mounted on a folder in the server. For example, assume LDEV1 is mounted on \folder1 at a server. Also assume there is a file with a path name which is \folder2\fileA. Thus the relative path name is File A.

FIG. 25 illustrates a discovered relationship table 430. This table manages the identifications of discovered relationships. In the example depicted, the relationship identified by RID 0002 is a backup relationship indicating that the files having GIDs shown in the column "Source" were backed up as data identified by the "Destination" column. While backup, archive, and replication actions are associated with data at two locations, the application itself only has source data. Thus "destination" is not applicable.

Using all of the tables discussed above and the various relationships created, in a manner which will be discussed in detail below, the system is capable of providing a comprehensive view of the relationships among the data stored in the affiliated storage systems. Exemplary graphical user interfaces for presenting these relationships to the user of the storage system are shown in FIGS. 26, 27, and 28. As should be understood, other graphical user interfaces (GUI) can also be created for presentation to the user to enable a better understanding of the data in the storage system. These interfaces will typically be of most benefit to an administrator of the data management system. Typically these interfaces will be presented on the console 113 shown in FIG. 1. Typical GUIs are discussed next.

FIG. 26 illustrates a "data view" GUI 250. In this exemplary GUI, the data manager presents a view related to the data itself. In the embodiment depicted, the GUI has two parts, a data specifying panel on the left hand side and an information panel on the right hand side of the figure. The data specification panel shows all of the applications and all of the data in the system that is being used by those applications. For example, in FIG. 26, the specification panel lists e-mail applications and within those applications an e-mail server A. That e-mail server has a number of files, shown in the example as A, B, and C. The user has chosen file A. In response the GUI is illustrating information about that file in the right hand panel shown in FIG. 26. This panel illustrates the relationship information about the data associated with file A. As shown at the top of the panel, the server and file location are shown, as well as all archived, replicated, and backed up copies of that file. As illustrated, file A has been archived by server B at the designated location, has been replicated by server C at the designated location, and has been backed up by server D at the designated location. By clicking on the "Details" designation, the user causes the system to retrieve "deeper" information about that data, for example it's size, the time of the event, or other information provided in the descriptor tables discussed above, and that data will be presented on the GUI.

FIG. 27 illustrates the GUI for a "storage view" of the data. The left hand panel shown in FIG. 27 corresponds to that discussed in FIG. 26, enabling the user to select a particular file. In the same manner as described there, the user selected file A, and thus the right hand panel of the storage view 260 is illustrating information about file A. That panel shows the LDEV and storage system where the original data is stored, as well as the LDEVs and the storage systems in which all of the data related to the original data are stored, as well as the relationships among those locations. For example, as shown in the upper portion of the right hand panel, the replica, archive, and backup relationships are illustrated.

FIG. 28 is a third GUI enabling the user to more easily understand the location of various data in the storage system and the path by which that data is being handled. FIG. 28 illustrates the "path view" GUI. As with the above FIGS. 26 and 27, the left hand side of the GUI 270 enables the user to select the particular file, while the right hand side depicts the topology map of the servers, switches, storage systems, and LDEVs for the original data, and for data related to the original data. This diagram also illustrates how data is transferred in the topology. To simplify the diagram, across the upper portion of the right hand panel in FIG. 28 are a series of "buttons." By clicking on one of these buttons, the screen will show a path through which data is transferred by the specified relationship.

The preceding discussion has discussed the various tables created and used by the data manager 111, and the graphical user interface for presentation of that data to a user of the system. The remaining portion of this specification discusses the manner in which the system operates to establish those tables and present the graphical user interfaces.

FIG. 29 is a flowchart illustrating a preferred embodiment of the data discovery process by the data manager shown in FIG. 1. The process is initiated by a user at the console 113 shown in FIG. 1. At a first step 290 the data manager retrieves an entry from the discovery configuration table shown in FIG. 23, unless that entry is a replication entry. If there is a non-replication entry the flow proceeds immediately downward as shown in FIG. 29. On the other hand, if there is no new entry, then the data discovery process retrieves a replication entry from the discovery configuration table as shown by step 296. Assuming there is a new entry, the data manager checks the type of server and executes one of three procedures 293, 294 or 295, depending upon the type of server, as shown by the loop in FIG. 29. After that entry is retrieved the process reverts back to step 290 to be repeated as many times as is necessary to retrieve all of the entries from all of the servers. The details of the particular "get data" procedure 293, 294, or 295 are discussed below. Once these procedures are completed, then the system reverts to checking the replication entries as shown by step 296. Assuming there are replication entries, then the procedure follows step 298, which is also discussed later below. Once all of the entries have been retrieved as shown at step 297, the data discovery process ends.

FIG. 30 illustrates in more detail the process flow for getting data from an application as shown by block 293 in FIG. 29. The data manager first connects to the SAM server via the network. It uses an identification and password in the discovery configuration table for the connection 300. It then retrieves a list of applications from the SAM server 301, and for each application a list of data files from that server as shown by step 302. As shown by step 303, for each data file on that list, the data manager gets a file system name in which the data file is stored in the SAM server. Then, as shown by step 304, for each file system a storage name and an LDEV on which the file system is created are also retrieved from the SAM server. Next, for each unique set (a name of a storage system, an LDEV, a data file relative path name) the data manager creates a new entry in the discovered data table and allocates a new global identification to that if there is not already an entry for that set. As shown by step 306, for each such GID, a data descriptor is created. Then, as shown by step 307, for each data descriptor, the data manager will retrieve logical information, file system information, and physical information from the SAM server and file that information into the data descriptor table. Then, as shown by step 308, for each application a new entry in the discovered relationship table is created and a new RID is provided if there is not already an entry for that application. Finally, as shown by step 309, for each RID the relationship descriptor for the application and the file information is then created. Once these steps are completed, the process flow returns to the diagram shown in FIG. 29.

FIG. 31 illustrates the process of retrieving data from the backup server, illustrated in FIG. 29 as step 294. Once this process is invoked, the operation is similar to that described in FIG. 30. In particular, the data manager first connects to a backup server via the network. It uses the ID and password information from the discovery configuration table for the connection, as shown in step 320. It also connects to the SAM server in the same manner, as shown in step 321. At step 322, the data manager retrieves a list of backup profiles from the backup server. As shown by step 323, for each such backup profile the data manager obtains a list of backup data from the backup server. Then, at step 324, for each backup data, the data manager retrieves a file system in which the backup stream is stored from the backup server. Next, as shown by step 325, for each unique file system a storage name and an LDEV on which the file system is created, are retrieved from the SAM server. Then, at step 326, for each unique set (name, LDEV, and backup stream relative path name) a new entry is created in the discovered data table and a new GID is allocated if there is not already an entry for that set. Next, at step 327, for each GID a data descriptor is created. Then, as shown at step 328, for each data descriptor logical information, file system information, and physical information from the SAM server is retrieved and provided to the data descriptor table.

FIG. 32 illustrates the process following step 328. As shown in FIG. 32, for each backup data, the data manager obtains a list of the data sources from the backup server at step 329. Then for each unique data source, a file system in which the data source is stored is also retrieved from the backup server at step 330. At step 331, for each unique file system, the data manager retrieves a storage name and an LDEV on which the file system is created from the same server. Then, at step 332, for each unique set of storage name, LDEV, and data source relative path name, a new entry is created in the discovered data table, and a new GID is allocated if there is not already an entry for that set. Then at step 333, a data descriptor is created for each GID. At step 334, for each data descriptor, logical information, file system information, and physical information is retrieved from the same server and filled into the data descriptor table. Then at step 336, for each backup data, a new entry is created in the discovered relationship table and a new RID is allocated if there is not already an entry for that backup data. Finally, at step 337 for each RID, a relationship descriptor for the backup information is created and this is filled into the discovered data table. That step concludes operations for the get data from backup step shown generally as step 294 in FIG. 29.

FIG. 33 illustrates the details behind the step of getting data from the archive, represented by step 295 in FIG. 29. As described above, these operations are similar to the other get data operations discussed in the previous few figures. The process begins with step 340 in which the data manager connects to the archive server using an ID and password information. It also connects to the same server with the ID and password information as shown by step 341. At step 343, it obtains a list of archive profiles, and at step 344, for each archive profile it obtains a list of archive data from the archive server. At step 345 for each archive data, it retrieves the file system in which the archive stream is stored from the archive server. Then for each unique set of a storage name, an LDEV, and an archive stream relative path name, a new entry is created in the discovered data table and a new GID is allocated if there is not already one for that set. Next at step 348, for each GID a data descriptor is created, and finally at step 349, for each such data descriptor logical information from a file system information and physical information from the SAM server is filled into the data descriptor table. The process then continues with FIG. 34.

As shown by step 350, for each archived data, a list of data sources is retrieved from the archive server. Then for each unique data source, a file system for that data source is retrieved from the archive server, as shown by step 351. Then, for each unique file system, the storage name and LDEV on which the file system is created are retrieved from the SAM server. Next, at step 353, for each unique set of a storage name, an LDEV, and a data source relative path name, a new entry is created in the discovered data table and a new GID is allocated if there is not already one for that set. Then a new data descriptor is created for each GID and for each such data descriptor, logical information, file system information, and physical information is retrieved from the SAM server and filled into the data descriptor table as shown by step 355. Then, for each archived data, a new entry is created in the discovered relationship table and a new RID is allocated if there is not already one for that data. Finally, a relationship descriptor is created for that RID and filled in to the data discovery table.

The process for getting data from the replica servers is similar to that described above. It is illustrated in FIG. 35. The process follows a flow of connecting to the replication server with an ID and password 360, connecting to the SAM server 361, and obtaining a list of replication profiles from the replication server 362. Then for each replication profile, selected information is retrieved at step 363, and for each such replication set, the data is located that is stored in these volumes at step 364. Then for each found data set a new entry is created in the discovered relationship table, and for each such new RID a relationship descriptor is created and the information filled into the table at step 366. This completes the description of the processes initially shown in FIG. 29. Next, the techniques for showing the various data, storage and path view. The steps for showing a data view are illustrated by the flow chart of FIG. 36. To show the data view, the data manager receives a server name, an application name, and a data file from the GUI, as shown by step 370. As discussed above, this selection will typically be made by the user choosing an appropriate entry in the left hand panel of the GUI. Then, as shown by step 371, the GID for the specified data is retrieved from the discovered data table, and at step 372, a list is retrieved of all RIDs that contain the GID from the discovered relationship table. If there are none, then the found GIDs may be displayed, as shown by step 376. If there are RIDs, then for each such RID, the GIDs and the destination are also retrieved from the discovered relationship table as shown by step 374. Once this is completed, the display is produced as shown by step 376.

FIG. 37 illustrates the steps for showing a storage view in the GUI. In a manner similar to that described with FIG. 36, the user selects various information as shown in step 380, and the GID for the specified data is retrieved from the discovered data table. The flow of operations through steps 382, 383, 384, and 385 matches that from FIG. 36. Then, at step 386, for each found GID the data manager finds the storage system and LDEVs in which the data specified by the GID is stored, and shows the storage as a storage icon on the screen and the LDEV as LDEV icons on the screen. Next, as shown by step 387, the LDEV icons are interconnected by relationship indicators for each found RID.

FIG. 38 is a flow chart illustrating the manner in which the path view GUI is created. Steps 390–395 are the same as those described above for the data and storage views. At step 396, for all of the found GIDs and RIDs find the related servers, switches, storage systems, and LDEVs that are related to the data or data applications specified by these found GIDs and RIDs. Following this step, the physical topology map for all the found hardware components is displayed at step 397, and relationship buttons are added at step 398. At step 399, if a button is pushed, then the system shows the data path by which the designated data is transferred, which information is provided by the SAM server.

FIG. 39 is a flow chart illustrating another feature provided by the system of this invention. FIG. 39 provides a technique for detecting a misconfiguration of a data backup by comparing the size of the backup data with the size of the original data. The process shown in FIG. 39 may be invoked by the user through the storage console 113 shown in FIG. 1. Upon invocation, the system receives a server name, an application, and a data file from the GUI as shown by step 400. Then the GID for the specified data is retrieved from the discovered data table and the list of RIDs that contain that GID are retrieved from the discovered relationship table. This process is repeated until all RIDs and GIDs are retrieved as shown by steps 403–405. At step 406 a calculation is performed for each GID with a full backup to determine the size of the backup stream. The size of the data files for that application are then computed at step 407. At step 408, if the amounts match, a successfully completed message is displayed at step 409, while if the amounts do not match, an error is displayed at step 410. Upon receipt of the error the user can then either reperform the backup or investigate the error and resolve it in some other manner.

The technology described has numerous applications. These applications are not restricted to backup, archive, replication, etc. The invention can be applied to other applications or custom applications in which data is to be analyzed and relationships determined. The invention is also not limited to files in the local file system or local server. Instead, the invention can be applied to volumes in storage systems and objects in object based storage devices, or files in network attached storage systems. It can be applied to volumes, and to storage systems which replicate volumes by themselves. The data manager in such an application can determine from the storage system or the replication server how the volumes are replicated and create a data descriptor for each volume without path information, and also create a relationship descriptor by using the replication relationship. In the case of network attached storage, the data is uniquely identified by an IP address, an exported file system and a relative path name.

While LDEV has been user herein to identify the uniqueness of data, other approaches may be used. The data manager may calculate a hash value for each data. Then the data manager can retrieve the logical location and physical location of such data from a SAM server. If the data are related to different locations, then the data manager can create a relationship descriptor for these data which indicates that the data are identical (in the case of duplicate hash values). This enables the user to see how many replications of data are present on the storage system and to determine which data can be deleted.

By checking a hierarchy of relationships among data and performance information from the data processing, the data manager can also detect at what location in the hierarchy a performance bottleneck exists. In such a case, the data manager which retrieves performance information for each relationship and determines if those numbers are restricted by physical resources or disturbances caused by other data processing or application software. The data manager also provides users a way to search for data and relationships among data by specifying some portion of the data. If the data manager receives such a request, the data manager can find data descriptors and relationship descriptors that include the specified information and provide it, for example as described on a graphical user interface.

Although the invention has been described in detail above with respect to a preferred embodiment, it will be appreciated that variations and alterations may be made in the implementation of the invention without departing from its scope as shown by the appended claims.

What is claimed is:

1. In a storage system having arrays of hard disk storage devices for storing information, a data manager operative to collect and store information about relationships among files stored in the storage system for presentation to a user, comprising:
    for a backup file of a first file, the data manager collects information about the backup file and creates an association between the first file and the backup file,
    for an archive file of the first file, the data manager collects information about the archive file and creates an association between the first file and the archive file,
    for a replication file of the first file, the data manager collects information about the replication file and creates an association between the first file and the replication file,
    wherein the information for the association between the first file and the backup file is stored in a backup server,
    wherein the information for the association between the first file and the archive file is stored in an archive server,
    wherein the information for the association between the first file and the replication file is stored in a replication server,
    wherein for a given file, the data manager displays one or more related files associated with the given file, the related files being one or more of a backup file, an archive file, or a replication file, and the data manager displays a graphical user interface that provides a user with the option of selecting from among a data view and a storage view and a path view.

2. Apparatus as in claim 1 wherein the relationships include information about locations where the data is stored in the storage system.

3. Apparatus as in claim 2 wherein the location information includes information about locations of at least one of replica, archive and/or back-up locations for the data.

4. Apparatus as in claim 1 wherein the relationships include at least one of a physical location and/or a virtual location for data stored in the system.

5. Apparatus as in claim 1 wherein the relationships include path information identifying a path to the data.

6. Apparatus as in claim 5 wherein the path information includes port and switch information for locating the data.

7. Apparatus as in claim 1, wherein the data view illustrates how the first file is related to other files by showing data locations of the backup file, archive file, and replication file.

8. Apparatus as in claim 1, wherein the storage view illustrates data volumes in the storage system that contain the first file, backup file, archive file, and replication file.

9. Apparatus as in claim 1, wherein the path view illustrates data handling processes in the storage system though which the first file is transferred.

10. A storage system having a plurality of processes operating therein for handling data, the storage system comprising at least two of a replication server for replicating stored data to provide replication copies of the stored data, and/or a backup server for providing backup copies of the stored data, and/or an archive server for archiving the stored data to provide archived copies of the stored data, the storage system further comprising a data manager for tracking and associating the stored data with respect to location information and path information,
    the location information being at least one of a location of the replication copies of the stored data, a location of the backup copies of the stored data, and/or a location of the archived copies of the stored data;
    the path information being at least one of a path to the replication copies of the stored data, a path to the backup copies of the stored data, and/or a path to the archived copies of the stored data; and
    wherein the data manager displays a graphical user interface that provides a user with the option of selecting from among a data view and a storage view and a path view.

11. A storage system as in claim 10 wherein the data manager receives user input and in response displays location information and path information associated with stored data identified in the user input.

12. A storage system as in claim 10, wherein the data view illustrates how the first file is related to other files by showing data locations of the backup file, archive file, and replication file.

13. A storage system as in claim 10, wherein the storage view illustrates data volumes in the storage system that contain the first file, backup file, archive file, and replication file.

14. A storage system as in claim 10, wherein the path view illustrates data handling processes in the storage system though which the first file is transferred.

15. A storage system comprising:
    at least one application server;
    a data manager;
    a first kind of server, the first kind of server being one of a backup server which creates backup files, an archive server which creates archive files, or a replication server which creates replication files;
    at least a second kind of server, the second kind of server being one of a backup server which creates backup files, an archive server which creates archive files, or a replication server which creates replication files; and
    a plurality of storage devices accessible by the application server, the data manager, the first kind of server, and the second kind of server,
    the data manager in communication with the first kind of server and the second kind of server and operative to collect information therefrom and to create relationship information indicative of associations among files stored in the storage system for presenting to a user, wherein the relationship information associates a first file with two of a backup file of the first file, an archive file of the first file, or a replication file of the first file, the first file being created by the application server and wherein the data manager displays a graphical user interface that provides a user with the option of selecting from among a data view and a storage view and a path view.

16. A storage system as in claim 15 wherein the data manager is further operative to present a graphical user interface (GUI) to a user, the GUI displaying one or more files and one or more view selectors, a first view selector corresponding to an action wherein location information of a backup file, or an archive file, or a replication file associated with a selected file is displayed, a second view selector corresponding to an action wherein path information of a backup file, or an archive file, or a replication file associated with a selected file is displayed.

17. A storage system as in claim 15, wherein the data view illustrates how the first file is related to other files by showing data locations of the backup file, archive file, and replication file.

18. A storage system as in claim 15, wherein the storage view illustrates data volumes in the storage system that contain the first file, backup file, archive file, and replication file.

19. A storage system as in claim 15, wherein the path view illustrates data handling processes in the storage system through which the first file is transferred.

* * * * *